(12) United States Patent
Usami et al.

(10) Patent No.: US 8,486,555 B2
(45) Date of Patent: Jul. 16, 2013

(54) METHOD FOR PRODUCING POROUS LAMINATE AND POROUS LAMINATE

(75) Inventors: Yasushi Usami, Shiga (JP); Tomoyuki Nemoto, Shiga (JP); Jun Takagi, Nagahama (JP); Satoshi Teshima, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 1082 days.

(21) Appl. No.: 12/067,231

(22) PCT Filed: Sep. 21, 2006

(86) PCT No.: PCT/JP2006/318705
§ 371 (c)(1),
(2), (4) Date: May 5, 2008

(87) PCT Pub. No.: WO2007/034856
PCT Pub. Date: Mar. 29, 2007

(65) Prior Publication Data
US 2009/0181295 A1    Jul. 16, 2009

(30) Foreign Application Priority Data

Sep. 22, 2005 (JP) ................................. 2005-274969
Sep. 22, 2005 (JP) ................................. 2005-275134

(51) Int. Cl.
*H01M 2/16* (2006.01)
*H01M 2/14* (2006.01)
*B29C 44/04* (2006.01)

(52) U.S. Cl.
USPC ........... 429/145; 429/142; 429/144; 429/249; 429/254; 264/45.1

(58) Field of Classification Search
USPC ...... 429/129–147, 247, 249, 254; 521/25–39, 521/62; 264/45.1, 45.5, 45.6, 46.4, 46.5, 264/48, 51–53; 428/158, 159
See application file for complete search history.

(56) References Cited

U.S. PATENT DOCUMENTS

| | | | |
|---|---|---|---|
| 4,650,730 A | * | 3/1987 | Lundquist et al. .............. 429/62 |
| 5,308,904 A | | 5/1994 | Fujii et al. |

(Continued)

FOREIGN PATENT DOCUMENTS

| | | |
|---|---|---|
| JP | 05/025305 | 2/1993 |
| JP | 8-138644 | 5/1996 |

(Continued)

OTHER PUBLICATIONS

Machine translation of JP2005-186283 A (Hirai).*

(Continued)

*Primary Examiner* — Raymond Alejandro
*Assistant Examiner* — Helen McDermott
(74) *Attorney, Agent, or Firm* — Oblon, Spivak, McClelland, Maier & Neustadt, L.L.P.

(57) ABSTRACT

A process for producing a porous laminate having many micropores interconnected in the thickness direction, which comprises: a step in which a laminate is produced which comprises at least three layers comprising an interlayer made of a thermoplastic resin having a hard segment and a soft segment and two nonporous outer layers made of a filler-containing resin and located as outer layers respectively on both sides of the interlayer; a step in which the laminate obtained is impregnated with a supercritical or subcritical fluid and this state is relieved to vaporize the fluid and thereby make the interlayer porous; and a step in which the two nonporous outer layers located respectively on both sides are made porous by stretching.

22 Claims, 2 Drawing Sheets

U.S. PATENT DOCUMENTS

| | | | |
|---|---|---|---|
| 5,691,047 A * | 11/1997 | Kurauchi et al. | 428/315.7 |
| 6,180,280 B1 * | 1/2001 | Spotnitz | 429/62 |
| 6,248,797 B1 * | 6/2001 | Dias et al. | 521/26 |
| 6,558,591 B2 * | 5/2003 | Calis | 264/41 |
| 6,623,674 B1 * | 9/2003 | Gehlsen et al. | 264/45.5 |
| 2003/0105176 A1 * | 6/2003 | Haas et al. | 521/79 |

FOREIGN PATENT DOCUMENTS

| | | |
|---|---|---|
| JP | 10-050286 | 2/1998 |
| JP | 10-330520 A | 12/1998 |
| JP | 11-60791 | 2/1999 |
| JP | 11-60792 | 3/1999 |
| JP | 11-115084 A | 4/1999 |
| JP | 11-170288 | 6/1999 |
| JP | 2001-135295 A | 5/2001 |
| JP | 2002-25531 | 1/2002 |
| JP | 2004-095550 | 3/2004 |
| JP | 2004-363048 | 12/2004 |
| JP | 2005-171230 | 6/2005 |
| JP | 2005-186283 | 7/2005 |

OTHER PUBLICATIONS

Machine translation of 08-138644 A (Takahashi).*

U.S. Appl. No. 13/641,883, filed Oct. 18, 2012, Takagi, et al.

* cited by examiner

METHOD FOR PRODUCING POROUS LAMINATE AND POROUS LAMINATE

CROSS-REFERENCE TO PRIOR APPLICATION

This is a U.S. National Phase Application under 35 U.S.C. §371 of International Patent Application No. PCT/JP2006/318705 filed Sep. 21, 2006, and claims the benefit of Japanese Patent Application Nos. 2005-274969, filed Sep. 22, 2005 and 2005-275134 filed Sep. 22, 2005, all of which are incorporated by reference herein. The International Application was published in Japanese on Mar. 29, 2007 as WO 2007/034856 A1 under PCT Article 21(2).

TECHNICAL FIELD

The present invention relates to a method for producing a porous laminate and the porous laminate obtained by using the producing method. The porous laminate is preferably utilized as packing articles, sanitary articles, livestock articles, agricultural articles, building articles, medical appliances, a separation film, a light diffusion plate, a reflection sheet, and a separator for a battery.

BACKGROUND ART

A polymeric porous film or sheet having a large number of micro-pores is utilized in various fields as separation films for use in the production of ultra-pure water, the formation of chemicals, water treatment; waterproof moisture-permeable films for use in cloths, sanitary materials, and the like; and a separator for a battery.

As this kind of techniques for forming a large number of interconnected micro-pores in high polymers, various techniques described below are proposed.

For example, proposed in Japanese Patent Application Laid-Open No. 5-25305 (patent document 1) is the method of obtaining a porous film by kneading ultra-high-molecular-weight polyethylene and a solvent to form the mixture into a sheet, stretching the sheet, and extracting the solvent.

In the above-described method, as described at the paragraph number [0045] of the specification, because the solvent is extracted by being cleaned with the organic solvent for cleaning use, a large amount of the organic solvent is necessary, which is unpreferable for environment.

Proposed in Japanese patent No. 3166279 (patent document 2) is the method for obtaining an interconnectable porous film or sheet by inflation-molding the resin composition containing the polyolefin resin and the filler and mono-axially stretching the obtained film or sheet in the take-off direction.

Also in Japanese Patent Application Laid-Open No. 2004-95550 (patent document 3), there is disclosed the porous film which is used as a separator for a lithium secondary battery. A sheet formed by molding the resin composition containing the thermoplastic resin and the filler is stretched at least mono-axially to obtain the porous film.

Because the filler is present in the surface of the porous films or sheets obtained in the above-described methods, irregularities are formed to a proper degree. Thus the film has a high sliding performance. But because the filler is present in all the layers, the mass thereof per unit area (basis weight) is large. Therefore there is room for improvement.

To keep the surface roughness of a porous film or sheet to some extent and make the basis weight small, in the porous film made of polyethylene resin disclosed in Japanese Patent Application Laid-Open No. 11-060792 (patent document 4), a surface roughening agent consisting of finely divided particles such as the filler is contained in only the surface thereof (claims 11, 12 and paragraph 0018).

But in the production of the porous film, the film is made porous by removing the plasticizer (claims 10 to 12). Similarly to the invention described in the patent document 1, a large amount of an organic solvent is necessary to remove the plasticizer. Therefore there is room for improvement to reduce a load to be applied to environment.

Proposed in Japanese Patent Application Laid-Open No. 10-50286 (patent document 5) is the porous film which is produced by heat-treating the film made of polyolefin, having a high melting point and the film made of the polyolefin having a low melting point to adjust birefringence and elastic recovery thereof, obtaining a laminate film having not less than three layers integrated with each other by thermal compression bonding, stretching the laminate film at two steps to make the laminate film porous, and performing thermal fixing so that the obtained porous film is used as a separator for a battery.

In a method called an open pore stretching method of forming pores through a single polymer, it is necessary to produce a preferable porous in a very narrow structure stretching condition (paragraphs [0025] through [0028]) including the stretching temperature, the ratio of a stretched dimension to an original dimension, the multi-stage stretching, and the like. Therefore it is unpreferable to produce the porous film by using the above-described method when considering a process management for producing it in the industrial scale.

A foaming technique of using a subcritical fluid or a supercritical fluid is known. More specifically, a polymer is impregnated with the subcritical fluid or the supercritical fluid to obtain a saturated state. Thereafter a super-saturated state is generated by rapidly reducing a pressure or the like to utilize foaming of a super-saturated gas.

The above-described method has advantages of providing fine and homogeneous foaming and applying little load to environment when an inert gas such as carbon dioxide or nitrogen is used as the subcritical fluid or the supercritical fluid.

But in the neighborhood of the surface of the polymer, when the pressure decreases suddenly, the super-saturated state is not generated but the gas is immediately discharged from the surface of the polymer owing to diffusion and vaporization thereof. Thus a region in which foaming is not generated, namely, a so-called skin layer is invariably present. Therefore it is impossible to form a porous laminate having micro-pores interconnected with each other in the thickness direction thereof.

Patent document 1: Japanese Patent Application Laid-Open No. 5-25305
Patent document 2: Japanese Patent No. 3166279
Patent document 3: Japanese Patent Application Laid-Open No. 2004-95550
Patent document 4: Japanese Patent Application Laid-Open No. 11-060792
Patent document 5: Japanese Patent Application Laid-Open No. 10-50286

DISCLOSURE OF THE INVENTION

Problems to be Solved by the Invention

The present invention has been made in view of the above-described problems and has for its object to provide a method for producing a porous laminate which is capable of interconnecting layers of the porous laminate with one another in a thickness direction thereof by not forming a skin layer on the surface thereof, although the conventional art is incapable of doing so by utilizing a subcritical fluid or a supercritical fluid, which little applies a load to environment by utilizing the subcritical fluid or the supercritical fluid, and which allows producing steps to be managed easily because the producing condition is wide.

It is another object of the present invention to provide a porous laminate having uniform interconnected micro-pores in its entirety and a small mass per unit area.

Means for Solving the Problems

To solve the above-described problem, as the first invention, the present invention provides a method for producing a porous laminate having a large number of micro-pores interconnected with each other in a thickness direction thereof, including the steps of:

forming a laminate including at least three layers comprising an interlayer, made of a thermoplastic resin, which has a hard segment and a soft segment and two pore-unformed outer layers, made of a resin composition, which are disposed on both outermost surfaces of the interlayer;

making the interlayer porous by forming the micro-pores therethrough after the obtained laminate is impregnated with a fluid in a supercritical state or a subcritical state, the fluid is relieved from the supercritical state or the subcritical state to vaporize the fluid; and interconnecting the micro-pores of the interlayer with micro-pores formed through both outer layers to make both outer layers porous after the interlayer is made porous.

It is preferable that the interlayer is made of a polypropylene composition containing ethylene-propylene rubber not containing a filler therein, that both outer layers are made of a resin composition essentially containing the filler and the thermoplastic resin, that pores are not formed in both outer layers by vaporization when a fluid which has impregnated the obtained laminate in the supercritical state or the subcritical state is relieved from the supercritical state or the subcritical state, and that to make both outer layers porous, the laminate is stretched to separate the interface between the filler and the resin layer so that the micro-pores are formed in both outer layers.

The present invention is made based on the result found by the present inventors' energetic repeated researches and experiments.

That is, the present inventors have made researches and experiments of allowing a laminate to be porous by utilizing the subcritical fluid or the supercritical fluid and made investigations, but could not avoid the non-formation of the above-described skin layer on the outer surface of the laminate. As described above, the non-formation of the skin layer is a problem to be solved.

The present inventors have found that by forming pore-unformed layers on a layer to be made porous by utilizing the subcritical fluid or the supercritical fluid, namely, by covering the layer to be made porous with the pore-unformed layer, it is possible to obtain the porous laminate having the micro-pores interconnected with the interlayer and the pore-unformed layers.

More specifically, after the laminate is impregnated with the subcritical fluid or the supercritical fluid, the pressure is suddenly reduced. At this time, because the interlayer is covered with the pore-unformed layers disposed at the outer sides of the interlayer, a super-saturated state can be generated on both surfaces of the interlayer without a vaporized gas being dispersed from both surfaces of the interlayer. As a result, the micro-pores could be formed through the interlayer. Thereafter micro-pores were formed through the outer layers serving as the cover by using a known art to make the outer layers porous. Thereby they could obtain the porous laminate having the micro-pores, formed through the outer layers, which were interconnected with the micro-pores of the interlayer in the thickness direction of the laminate.

In the producing method of the present invention, as described above, at the first step, there is formed the laminate having at least three layers including an interlayer, made of the thermoplastic resin, which has the hard segment and the soft segment and the pore-unformed outer layers, made of the resin composition, which are disposed at both outer sides of the interlayer.

As the thermoplastic resin composing the interlayer, known thermoplastic resins can be used, provided that they have the hard segment and the soft segment respectively.

The hard segment plays the role of keeping the strength of the interlayer, whereas the soft segment has the role of impregnating the laminate with the subcritical fluid or the supercritical fluid. To allow each segment to securely play the above-described role, it is preferable to set the ratio of the hard segment to 5 to 95 mass % and that of the soft segment to 95 to 5 mass %. When the ratio of the hard segment is less than 5 mass %, the interlayer is so soft that there is a fear that the interlayer is incapable of keeping its strength and that the subcritical fluid or the supercritical fluid is incapable of staying in the interlayer and the interlayer is deaerated, and hence the interlayer cannot be made porous. On the other hand, when the ratio of the soft segment is less than 5 mass %, the impregnation amount of the subcritical fluid or that of the supercritical fluid is small and thus it is difficult to obtain a sufficient degree of interconnection.

It is preferable that the thermoplastic resin composition composing the interlayer does not contain the filler. This is because the present invention is intended to provide the porous laminate having a small mass per unit area.

As the soft segment consisting of the thermoplastic resin composing the interlayer, polyisoprene, polybutadiene, hydrogenated polybutadiene, hydrogenated polyisoprene, amorphous polyethylene, polyvinyl chloride, polyether, ethylene-propylene rubber, isobutene-isoprene rubber, fluororubber, and silicone rubber are listed. As the hard segment, polystyrene, polyethylene, polypropylene, polyurethane, polyester, polyamide, polybutylene terephthalate, and fluororesin are listed.

More specifically, as the thermoplastic resin composing the interlayer, olefin thermoplastic resins, styrene thermoplastic resins, polyester thermoplastic resins, and polyamide thermoplastic resins are listed.

As polymers of the hard segment composing the olefin thermoplastic resins, polyethylene or polypropylene is used. As polymers of the soft segment composing the olefin thermoplastic resins, ethylene-propylene rubber, ethylene-propylene-diene rubber, hydrogenated polybutadiene, and hydrogenated polyisoprene are listed.

As polymers of the hard segment composing the styrene thermoplastic resins, it is possible to use polymers having styrene, styrene derivatives such as methyl styrene, indene or vinyl naphthalene as a composing unit. It is preferable to use polystyrene. As polymers of the soft segment composing the styrene thermoplastic resins, polyolefin elastomers such as conjugate diene polymers including polybutadiene or polyisoprene, ethylene/butylene copolymers, and ethylene/propylene copolymers, and polyisobutene are listed.

As polymers of the hard segment composing the polyester thermoplastic resins, aromatic polyesters, alicyclic polyesters, derivatives thereof, and mixtures thereof are used. As polymers of the soft segment composing the polyester thermoplastic resin, polyalkylene glycols such as polytetramethylene glycol and poly(ethylene/propylene) block polyglycol are listed.

As polymers of the hard segment composing the polyamide thermoplastic resins, polyamides such as polyamide 6, polyamide 66, polyamide 610, polyamide 612, polyamide 11, polyamide 12 and copolymers of these polyamides are used. As polymers of the soft segment composing the polyamide thermoplastic resins, polyalkylene glycols such as polytetramethylene glycol and poly(ethylene/propylene) block polyglycol are listed.

In the present invention, as the thermoplastic resin composing the interlayer, the olefin thermoplastic resins are preferable.

As the hard segment composed of the olefin thermoplastic resins, the following resins are listed.

Homopolymer resins of ethylene, and copolymer resins containing the ethylene as its main component and α-olefin having not less than three carbon atoms as its auxiliary;

Homopolymer resins of propylene, and copolymer resins containing the propylene as its main component, the ethylene or α-olefin having not less than four carbon atoms;

Homopolymer resins of 1-butene, and copolymer resins containing 1-butene as its main component, the ethylene, the propylene or the α-olefin having not less than five carbon atoms;

Homopolymer resins of 4-methyl-1-pentene and copolymer resins containing 4-methyl-1-pentene as its main component, the ethylene, the propylene, the 1-butene or the α-olefin having not less than six carbon atoms;

Modified substance of the above-described resins

These olefin thermoplastic resins are used singly or in combination of not less than two kinds thereof.

As the soft segment composing the olefin thermoplastic resins, diene rubber, hydrogenated diene rubber, and olefin elastomers are listed.

As the diene rubber, isoprene rubber, butadiene rubber, butyl rubber, propylene-butadiene rubber, acrylonitrile-butadiene rubber, acrylonitrile-isoprene rubber, and styrene-butadiene rubber are listed.

The hydrogenated diene rubber contains hydrogen atoms added to at a portion of the double bond of the molecules of the diene rubber.

The olefin elastomer is an elastic copolymer containing at least one kind of polyene copolymerizable with two or not less than three kinds of olefins. As the olefins, α-olefin such as ethylene, propylene, and the like are used. As the polyenes, 1,4-hexadiene, cyclic diene, norbornene, and the like are used. As preferable olefin elastomers, ethylene-propylene copolymer rubber, ethylene-propylene-diene rubber, and ethylene-butadiene rubber copolymer are listed.

As the resins composing the interlayer of the porous laminate of the present invention, of the olefin thermoplastic resins, the olefin thermoplastic resins having the propylene resins are favorable as the hard segment. The olefin thermoplastic resins having the propylene resins as the hard segment and having the ethylene-propylene rubber at the rate of 5 to 95 mass % as the soft segment are especially preferable.

The reason the content of the ethylene-propylene rubber contained in the polypropylene resin composition composing the interlayer is set to 5 to 95 mass % is as described below: When the content of the ethylene-propylene rubber is less than 5 mass %, the impregnation amount of the subcritical fluid or that of the supercritical fluid is small, which makes it difficult to obtain a sufficient degree of interconnectability. On the other hand, when the content of the ethylene-propylene rubber is more than 95 mass %, the polypropylene resin composition is so soft that the interlayer is incapable of having a proper degree of strength and further the subcritical fluid or the supercritical fluid are incapable of staying in the interlayer and the interlayer is deaerated. Thus there is a fear that the interlayer cannot be sufficiently made porous.

The propylene resins composing the hard segment include a homopolymer and a copolymer. The copolymer includes a random copolymer and a block copolymer. The homopolymer is the homopolymer of propylene. The homopolymer is the propylene which is isotactic or syndiotactic and stereoregular to various extents. As the copolymer, copolymers containing the propylene as its main component and α-olefin such as ethylene, 1-butene, 1-pentene, 1-hexene, 4-methyl-1-pentene, 1-heptene, 1-octene or 1-decene are used. These copolymers may be composed of two, three or four components or consist of the random copolymer or the block copolymer.

Resins having a melting point lower than that of the propylene homopolymer can be mixed with the propylene resin. As the resins having the melting points lower than that of the propylene homopolymer, high-density polyethylene or low-density polyethylene can be exemplified. The mixing amount thereof is preferably 2 to 50 mass %.

The ethylene-propylene rubber composing the soft segment includes a bipolymer of ethylene and propylene and a terpolymer containing a small amount of a non-conjugate diene monomer as a third component. Both the bipolymer and the terpolymer can be used in the present invention. As non-conjugate diene monomer, dicyclopentadiene, ethylidene norbornene, and hexadiene are listed.

The ethylene-propylene rubber having an ethylene content ratio at 7 to 80 mass % for the entire rubber is favorable. The ethylene-propylene rubber having an ethylene content ratio at 10 to 60 mass % is more favorable.

It is preferable to set the ethylene content ratio to 5 to 95 mass % for the entire resin composition composing the interlayer by adjusting the content of the ethylene-propylene rubber or the content ratio of the ethylene contained in the ethylene-propylene rubber.

The resin composing the interlayer of the porous laminate is classified into a compound-type polymer obtained by blending a soft component such as the ethylene-propylene rubber composing the soft segment with the propylene resin composing the hard segment by using a kneader such as a twin screw extruder and a polymerization-type polymer obtained by directly polymerizing ethylene and propylene with each other.

From the standpoint of the dispersibility of the soft component such as the ethylene-propylene rubber composing the soft segment, it is preferable to use the polymerization-type polymer.

As a method for increasing the content ratio of the soft segment, a method for blending a soft component such as the ethylene-propylene rubber with a propylene copolymer commercially available is known. In this case, it is possible to easily increase the content ratio of the soft segment by using the kneader such as the twin screw extruder.

By blending the ethylene propylene rubber or the polyethylene with the propylene homopolymer by using the kneader such as the twin screw extruder or the like, it is possible to obtain the olefin thermoplastic resin composing the soft segment having a preferable content ratio.

It is preferable that the filler is contained not in the thermoplastic resin composition composing the interlayer but in both outer layers. By disposing the filler locally in the outermost layers, it is possible to keep the sliding performance of the porous laminate to a high extent and prevent the mass per area from greatly increasing especially when the inorganic filler is used.

The thermoplastic resin composition composing the interlayer may contain additives to be contained in ordinary resin compositions in a range where the object of the present invention is not changed nor the characteristic of the interlayer is damaged. For example, the thermoplastic resin composition composing the interlayer may contain an antioxidant, a heat stabilizer, a light stabilizer, an ultraviolet ray absorber, a neutralizer, an anti-fogging agent, an anti-blocking agent, an antistatic agent, a slip agent or a colorant.

Both outer layers disposed at both outer sides of the porous laminate with the interlayer being interposed therebetween are composed of the resin composition through which pores are not formed before the stretching step is performed. It is preferable that both outer layers are composed of a thermoplastic resin compatible with the thermoplastic resin composing the interlayer.

This is because unless the thermoplastic resin composing both outer layers and the thermoplastic resin composing the interlayer are compatible with each other, a super-saturated state is little generated at the interface between both outer layers and the interlayer, even though the laminate is impregnated with the subcritical fluid or the supercritical fluid and thereafter the pressure is rapidly dropped. Consequently a gas is discharged from the interface owing to diffusion and vaporization thereof. Thus there is a possibility that micro-pores interconnected with the outer layers and the interlayer cannot be formed.

As the thermoplastic resin composing both outer layers, polyolefin resin, fluororesin, polystyrene, acrylonitrile-butadiene-styrene (ABS) resin, vinyl chloride resin, vinyl acetate resin, acrylic resin, polyamide resin, acetal resin, and polycarbonate resin are listed.

It is preferable to use the polyolefin resin as the thermoplastic resin. When the porous laminate is used as a separator for a battery, it is preferable to use the polyolefin resin to allow the polyolefin resin to be stable for an electrolytic solution. As the polyolefin resin, mono-olefin polymers such as ethylene, propylene, 1-butene, 1-hexene, 1-octene, and 1-decene; and copolymers of the ethylene, the propylene, the 1-butene, the 1-hexene, the 1-octene, and the 1-decene and monomers such as 4-methyl-1-pentene and vinyl acetate are listed. Above all, it is preferable to use polypropylene, high-density polyethylene, low-density polyethylene, linear low-density polyethylene, polybutene, a propylene-ethylene block copolymer, or a propylene-ethylene random copolymer.

The thermoplastic resin contains at least 50 parts by mass, favorably not less than 80 parts by mass, and more favorably not less than 95 parts by mass of the polyethylene as its main component for 100 parts by mass of the thermoplastic resin.

As the polyethylene, although both the polyethylene homopolymer and the polyethylene copolymer can be used, the polyethylene homopolymer is more favorable. It is preferable that the polyethylene copolymer contains not more than 2 mol % of an α-olefin co-monomer. The kind of the α-olefin co-monomer is not limited to a specific kind.

It is preferable that the density of the polyethylene is set to not less than 0.92 g/cm$^3$. The reason the density of the polyethylene is set to not less than 0.92 g/cm$^3$ is to impart a predetermined strength and rigidity to both outer layers to such an extent that both outer layers are not easily torn, even though the thickness thereof is as thin as 5 to 40 µm. The density of the polyethylene is set to more favorably not less than 0.94 g/cm$^3$. Although the upper limit of the density of the polyethylene is not specifically limited, the polyethylene having a density about 0.97 g/cm$^3$ is preferable.

The melt flow rate of the polyethylene is set to not more than 10 g/10 minutes and favorably 1 g/10 minutes. When the melt flow rate is more than 10 g/10 minutes, the strength of the porous laminate may be low.

As methods for obtaining polyethylene by polymerization, a one-stage polymerization method, a two-stage polymerization method, and a multi-stage polymerization method are known. Polyethylene obtained by using any of the above-described methods can be used. A catalyst for obtaining the polyethylene by polymerization is not limited to a specific one, but catalysts of any of a Ziegler type, a Phillips type, and a Kaminsky type can be used.

Although the polyethylene can be singly used for both outer layers, a thermoplastic resin commonly used may be mixed with the polyethylene.

Listed as the thermoplastic resin that can be mixed with the polyethylene are polyolefin resin, fluororesin, polystyrene, vinyl acetate resin, acrylic resin, polyamide resin, acetal resin, and polycarbonate. Polypropylene, polybutene, a propylene-ethylene block copolymer, and a propylene-ethylene random copolymer are preferable. It is preferable that the thermoplastic resin that can be mixed with the polyethylene has a melting point not less than 140° C.

When other thermoplastic resins are mixed with the polyethylene, the mixing amount of the other thermoplastic resins for 100 parts by mass of the polyethylene is set to 1 to 100 parts by mass and favorably 1 to 50 parts by mass.

The composition composing both outermost layers may contain additives to be contained in ordinary resin compositions in a range where the object of the present invention is not changed nor the characteristic of the outermost layers is damaged. It is possible to exemplify the same additives as those that can be contained in the interlayer. It is preferable to set the mixing amount of the additives to 1 to 30 parts by mass for 100 parts by mass of the thermoplastic resin composing the outermost layers.

The composition composing both outer layers contain a filler which is a necessary component when a stretching method is adopted to make both outer layers porous at a third step which will be described in detail later.

At the third step, it is preferable to make both outer layers porous by using the stretching method. In that case, the interface between the resin and the filler added thereto is separated to make both outer layers porous.

As the filler, both an inorganic filler and an organic filler can be used. It is possible to use them singly or in combination of not less than two kinds thereof.

Listed as the inorganic filler are carbonates such as calcium carbonate, magnesium carbonate, and barium carbonate; sulfates such as calcium sulfate, magnesium sulfate, and barium sulfate; chlorides such as sodium chloride, calcium chloride, and magnesium chloride; oxides such as calcium oxide, magnesium oxide, zinc oxide, titanium oxide, and silica; and silicates such as talc, clay, and mica. Of these substances, barium sulfate is preferable.

To improve the dispersibility of the inorganic filler in the resin composition, the surface of the inorganic filler may be coated with a surface-treating agent to make the inorganic filler hydrophobic. As the surface-treating agent, higher fatty acid such as stearic acid, lauric acid, and the like and metal salts thereof are listed.

It is preferable that resinous particles of the organic filler have a melting point higher than that of the thermoplastic resin composing the outermost layer of the porous laminate and are crosslinked so that the gel thereof is set to 4 to 10% to prevent the filler from fusing at a stretching temperature.

Listed as the organic filler are thermoplastic resins and thermosetting resins such as ultra-high-molecular-weight polyethylene, polystyrene, polymethyl methacrylate, polycarbonate, polyethylene terephthalate, polybutylene terephthalate, polyphenylene sulfide, polysulfone, polyether sulfone, polyether ether ketone, polytetrafluoroethylene, polyimide, polyetherimide, melamine and benzoguanamine. Of these organic fillers, crosslinked polystyrene is preferable.

The average particle diameter of the filler is set to about 0.01 to 25 μm, favorably 0.05 to 7 μm, and more favorably 0.1 to 5 μm. When the average particle diameter of the filler is less than 0.01 μm, the dispersibility of the filler deteriorates owing to the aggregation of particles thereof and nonuniformity is caused in stretching the laminate and thus it is difficult to make both outer layers porous. On the other hand, when the average particle diameter of the filler is more than 25 μm, it is possible to form large irregularities. But there is a high possibility that pore diameters of the porous laminate in the surface are very nonuniform, which is unpreferable.

The mixing amount of the filler cannot be the definitely because the mixing amount thereof is different according to the kind of the filler. But the mixing amount of the filler for 100 parts by mass of the thermoplastic resin composing both outer layers is favorably 25 to 400 parts by mass and more favorably 50 to 300 parts by mass. When the mixing amount of the filler is less than 25 parts by mass for 100 parts by mass of the thermoplastic resin, it is difficult to obtain desired preferable gas permeability and appearance and touch are liable to be unfavorable. On the other hand, when the mixing amount of the filler is more than 400 parts by mass for 100 parts by mass of the thermoplastic resin, trouble such as scorch of the resin is liable to occur in a step of producing the laminate and in addition the strength of the porous laminate deteriorates to a high extent.

It is preferable that both outer layers contain a plasticizer to enhance the dispersibility of the filler into the resin composition for both outer layers.

Listed as the plasticizer are ester compounds, amide compounds, alcohol compounds, amine salts, amine compounds (amine salts are excluded), epoxy compounds, ether compounds, mineral oil, fats and oils, paraffin wax, liquid silicone, fluoro-oil, liquid polyethers, liquid polybutenes, liquid polybutadienes, long-chain fatty acid, carboxylates, carboxylic acid compounds (carboxylates are excluded), sulfonates, sulfone compounds (sulfonates are excluded), and fluorine-containing compounds are listed.

Specifically, "Plastic Additives" (second edition published by Taisei Ltd. on Nov. 30, 1988) described on pages 31 through 64, 83, 97 through 100, 154 through 158, 178 through 182, 271 through 275, 283 through 294 are listed. More specifically, it is possible to use the plasticizers (TCP, TOP, PS, ESBO, and the like) described in the items of the plasticizer on pages 29 through 64, in the table 4 on pages 49 and 50, and in the table 6 on pages 52 through 54. The compounds of the surface active agents listed in a book of "Guide to Surface Active Agent" (third edition published by Sanyo Chemical Industries, Ltd. in August of 1992) can be preferably used as the plasticizers.

As the above-described ester compound, tetraglycerin tristearate, glycerin tristearate, stearyl stearate, glycerin monostearate, sorbitan monostearate, ethylene carbonate, distearyl carbonate, and dioctyl naphthalate are listed.

As the amide compound, ethylene-bis-stearic acid amide, hexamethylene-bis-stearamide, and the like are listed.

As the alcohol compound, stearyl alcohol, oleyl alcohol, and dodecylphenol are listed.

As the amine salt, stearyldimethylbetaine and lauryltrimethylammonium chloride are listed.

As the amine compound, dihydrodiethylstearylamine, laurylamine, and the like are listed.

As the epoxy compound, epoxy soybean oil is exemplified.

As the ether compound, triethylene glycol is exemplified.

As the mineral oil, kerosene, naphthene oil, and the like are listed.

As the fats and oils, castor oil, hardened castor oil, and derivatives thereof are listed.

As the fatty acid, stearic acid and caproic acid are listed.

As the carboxylate, calcium stearate, sodium oleate, and the like are listed.

As the compound of carboxylic acid, stearic acid, oleic acid, and derivatives (carboxylate is excluded) such as esters of these acids are listed.

As the sulfonate, dodecylbenzenesulfonic acid sodium salt and the like are listed.

As the sulfone compound, compounds having a sulfo bond (sulfonate is excluded) are exemplified. Sulfolane and dipropyl sulfonate are exemplified.

It is preferable that the above-described plasticizers contain hardened caster oil.

The hardened castor oil is ester obtained by a reaction between glycerin and a mixture of fatty acids in which 12-hydroxyoctadecanoic acid which is saturated fatty acid obtained by hydrogenating the double bond of ricinoleic acid is contained as the main component thereof. The above-described ester includes monoester, diester, and triester. These esters can be used singly or as mixtures thereof. A mixture containing the triester as its main component is preferable.

As fatty acids other than the 12-hydroxyoctadecanoic acid contained in the mixture of fatty acids, hexadecanoic acid, octadecanoic acid, and the like having 12 to 22 carbon atoms are listed. Industrially, the hardened castor oil is produced by hydrogenating castor oil that is non-drying oil.

The mixing amount of the plasticizer for 100 parts by mass of the thermoplastic resin composing both outer layers is set to favorably 1 to 30 parts by mass, more favorably 1 to 15 parts by mass, and most favorably 2 to 10 parts by mass. When the mixing amount of the plasticizer for 100 parts by mass of the thermoplastic resin is less than one part by mass, the porous laminate is liable to have unfavorable appearance, touch, and the like, and further it is difficult to generate a favorable stretchability when the outermost layer is made porous by the stretching method. When the mixing amount is more than 30 parts by mass, trouble such as scorch of the resin is liable to occur in a step of producing the porous laminate.

The construction of the laminate formed at the first step of the production method of the present invention is not limited to a specific one, provided that the laminate is composed of at least three layers including the interlayer and the two pore-unformed outer layers disposed at both outer sides of the porous laminate with the interlayer being interposed therebetween.

For example, the interlayer may be composed of a plurality of layers having different compositions, and one or both of the outer sides of the porous laminate may be composed of a plurality of layers having different compositions. The porous laminate may be composed of five layers in which a pore-unformed layer having the same composition as that of the outermost layer is interposed between two interlayers. In this case, interlayers having two different kinds of compositions not containing the filler are continuously layered on each other.

The compositions of both outer layers or the constructions thereof may be identical to or different from each other respectively. For example, when the substance one of both outer layers contacts is different from the substance the other of both outer layers contacts, it is necessary to select the thermoplastic resin in conformity to the property of each of both outer layers. For example, when one of both outer layers contacts water, whereas the other both outer layer contacts an organic solvent, polystyrene having a high resistance to the water is used as the thermoplastic resin composing the outermost layer which contacts the water, whereas polypropylene having a high resistance to the organic solvent is used as the thermoplastic resin composing the outermost layer which contacts the organic solvent.

Similarly to the thermoplastic resin contained in both outer layers, when one of both outer layers contacts a neutral liquid, whereas the other of both outer layers contacts an acidic liquid, calcium carbonate is contained in one of both outer layers which contacts the neutral liquid, whereas barium sulfate is contained in the other of both outer layers which contacts the acidic liquid.

When the laminate formed at the first step of the production method of the present invention is stretched at the third step, the ratio tr (=to/t) of the total of the thicknesses of both outermost layers to the thickness t of all the layers after the laminate is stretched is adjusted to 0.05 to 0.95, favorably 0.10 to 0.90, and more favorably 0.15 to 0.80.

When the ratio of tr is less than 0.05, the substantial thicknesses of both outermost layers will become extremely thin. Consequently the porous structures of both outermost surfaces are liable to become extremely nonuniform. When the thicknesses of both outermost layers are extremely thin, the outermost layers will not serve as the cover. More specifically, when the laminate is impregnated with the supercritical fluid or the subcritical fluid, and subsequently when the fluid is relieved from the supercritical fluid or the subcritical fluid, the gas will be discharged from the surface of the interlayer and penetrate through the thin outermost layer owing to the diffusion and vaporization thereof. Thus there is a fear that the interlayer will have a region in which foam is not generated, i.e., a so-called skin layer is generated in the interlayer.

On the other hand, when the ratio of tr is larger than 0.95, the interlayer will become extremely thin. Thus the obtained porous laminate is not substantially different from a porous film containing the filler in all layers thereof and poses a problem that the mass per area (basis weight) is large.

As the method for producing the laminate composed of at least three layers including both outer layers and the interlayer, known techniques may be used. For example, the laminate can be formed by using the following method.

Initially components composing each layer are mixed with one another by using a powder mixer such as a Henschel mixer or a kneading machine such as a single screw kneader, a twin screw kneader or a kneader. The obtained mixture may be granulated.

The laminate is formed from the resin composition or the granulated components composing both outer layers and the resin composition or the granulated components composing the interlayer.

As methods for producing the laminate, a heat bonding method, an extrusion lamination method, a dry lamination method, and a co-extrusion method are listed. The co-extrusion method to be carried out by a T-die molding method or an inflation molding method is especially preferably used. This is because a method of forming the interlayer and the outermost layers separately and fusing them to each other with a heat roll or the like has difficulty in bonding them to each other with a uniform bonding strength and a disadvantage that they are liable to wrinkle. There is a tendency for a thin film to have the above-described disadvantages. Thus normally the co-extrusion method is used.

At the second step in the method of the present invention for producing the porous laminate, the laminate obtained at the first step is impregnated with the supercritical fluid or the subcritical fluid. Thereafter the fluid is relieved from the supercritical state or the subcritical state to vaporize the fluid so that the interlayer is made porous.

Although gases that can be used as the supercritical fluid or the subcritical fluid are not limited to those shown below, it is possible to list carbon dioxide, nitrogen, nitrous oxide, ethylene, ethane, tetrafluoroethylene, perfluoroethane, tetrafluoromethane, trifluoromethane, 1,1-difluoroethylene, trifluoroamide oxide, cis-difluorodiazine, trans-difluorodiazine, chlorodifluoronitrogen, phosphorus trideuteride, dinitrogen tetrafluoride, ozone, phosphine, nitrosyl fluoride, nitrogen trifluoride, deuterium chloride, hydrogen chloride, xenon, sulfur hexafluoride, fluoromethane, perfluoroethane, tetrafluoroethane, pentafluoroethane, tetrafluoromethane, trifluoromethane, 1,1-difluoroethene, ethyne, diborane, water, tetrafluorohidrazine, silane, silicon tetrafluoride, germanium tetrahydride, boron trifluoride, carbonyl fluoride, chlorotrifluoromethane, bromotrifluoromethane, and vinyl fluoride are listed.

As preferable gases, the carbon dioxide, the nitrogen, the nitrous oxide, the ethylene, the ethane, the tetrafluoroethylene, the perfluoroethane, the tetrafluoromethane, the trifluoromethane, and the 1,1-difluoroethylene are listed.

Of these gases, the carbon dioxide and the nitrogen which are inactive gases are especially preferable because they are inflammable, non-toxic, inexpensive, and inactive with most polymers.

The "supercritical state" means a state having a temperature and a pressure exceeding a limit temperature (critical temperature) and a limit pressure (critical pressure) at which a gas and a liquid are capable of coexisting. The "subcritical state" means a state in which the temperature is in the neighborhood of the critical temperature or the pressure is in the neighborhood of the critical pressure.

Supposing that the critical temperature is Tc and that the critical pressure is Pc, the temperature is preferably not less than 0.7 Tc and/or the pressure is not less than 0.7 Pc (the case where the temperature is not less than Tc and the pressure is not less than Pc is excluded). It is especially preferable that the pressure exceeds the critical pressure or the temperature exceeds the critical temperature.

The supercritical fluid or the subcritical fluid is a peculiar fluid showing properties different from normal gases and liquids and has a very high impregnating performance. Thus by bringing the supercritical fluid or the subcritical fluid into contact with the laminate obtained at the first step, the laminate is impregnated with the supercritical fluid or the subcritical fluid.

As the method for impregnating the laminate with the supercritical fluid or the subcritical fluid, known methods can be used.

For example, after the laminate is put in a pressure container such as an autoclave or the like, a gaseous or liquid substance with which the laminate is impregnated is enclosed in the pressure container. Thereafter the temperature and/or the pressure inside the pressure container are increased to generate the supercritical state or the subcritical state. More specifically, the temperature inside the pressure container is increased to not less than 0.7 Tc or favorably to not less than the critical temperature. Alternatively the pressure inside the pressure container is increased to not less than 0.7 Pc or favorably to not less than the critical pressure. It is more favorable to increase the temperature inside the pressure container to not less than the critical temperature and the pressure inside the pressure container to not less than the critical pressure.

More specifically, when carbon dioxide is used, it is preferable to set the pressure to not less than seven MPa with the temperature kept at a normal temperature because the critical temperature of the carbon dioxide is 31.1° C. and the critical pressure thereof is 7.38 MPa.

When nitrogen is used, it is preferable to set the pressure to not less than three MPa with the temperature kept at a normal temperature because the critical temperature of the nitrogen is −147° C. and the critical pressure thereof is 3.40 MPa.

When nitrous oxide is used, it is preferable to set the pressure to not less than seven MPa with the temperature kept at a normal temperature because the critical temperature of the nitrous oxide is 36.4° C. and the critical pressure thereof is 7.24 MPa.

When ethylene is used, it is preferable to set the temperature to not less than 10° C. and the pressure to not less than five MPa because the critical temperature of the ethylene is 9.2° C. and the critical pressure thereof is 5.04 MPa.

When ethane is used, it is preferable to set the pressure to not less than 4.5 MPa with the temperature kept at a normal temperature because the critical temperature of the ethane is 32° C. and the critical pressure thereof is 4.88 MPa.

The period of time in which the interlayer is impregnated with the supercritical fluid or the subcritical fluid is different according to the composition of the resin composing the interlayer and a desired gas permeability and porosity and thus cannot be the definitely. But it is preferable to set the impregnating period of time to nor less than one minute. When the impregnating period of time is less than one minute, the interlayer cannot be sufficiently impregnated with the supercritical fluid or the subcritical fluid. From the standpoint of production efficiency, the upper limit of the period of time in which the interlayer is impregnated with the supercritical fluid or the subcritical fluid is set to not more than 10 hours, favorably not more than five hours, and most favorably not more than two hours.

Thereafter the fluid is relieved (departed) from the supercritical state or the subcritical state to vaporize the fluid and make the interlayer porous.

At this time, the temperature or the pressure may be rapidly returned to a normal temperature or a normal pressure or gradually decreased. Alternatively the temperature or the pressure may be reduced to not more than the normal temperature or not more than the normal pressure and thereafter may be returned to the normal temperature or the normal pressure.

At the second step of the producing method of the present invention, the layer to be porous is no limited to the interlayer, but there is no problem if the surface of the layer in contact with the interlayer and the neighborhood thereof are made porous.

At the third step in the method of the present invention for producing the porous laminate, two pore-unformed layers disposed at the outer sides of the laminate having the porous interlayer are made porous.

Although the method for making the pore-unformed layers porous is not limited to a specific method, but it is possible to use known methods such a stretching method, a phase separation method, an extraction method, a chemical treatment method, an irradiation etching method, a foaming method, combinations of these methods. Of these methods, the stretching method is preferable.

The stretching method is used to form micropores by using a stretching process. The stretching method is classified into:

a method (a) for forming micro-pores by forming the outermost layers by using a composition containing a resin and a filler added thereto and stretching the laminate to separate the interface between the resin and the filler;

a method (b) for forming micro-pores by stretching a resin such as polyethylene, polypropylene, polytetrafluoroethylene or the like having a crystal structure to separate the interface between crystal portions and amorphous portions. Of these methods, the method (a) is preferable.

The stretching processing to be carried out by the method (a) for making both outer layers containing the filler porous may be performed by mono-axial stretching or biaxial stretching. But in view of the isotropy of the porous laminate, the biaxial stretching is more favorable. It is possible to use both simultaneous biaxial stretching and sequential biaxial stretching of stretching the laminate longitudinally (lengthwise) and thereafter transversely. As a stretching method, it is possible to use known methods of using a roll stretching machine or a tenter stretching machine. The stretching ratio of a stretched dimension is set to not less than two times, favorably 4 to 25 times, and more favorably 9 to 16 times the original dimension in an area ratio.

Although the stretching temperature is not specifically limited, the laminate is stretched at a temperature lower than the melting point of the thermoplastic resin composing both outer layers and favorably at a lower temperature not more than 30° C. than the melting point. If the stretching temperature is very close to the melting point of the thermoplastic resin, it is difficult to interconnect the micro-pores in the outermost layers.

It is possible to take a measure for thermal contraction, dimensional stability or the like by performing thermal fixing or relaxation in the neighborhood of the melting point of the thermoplastic resin as necessary after the stretching processing terminates.

As necessary, it is possible to perform heat treatment for allowing the porous laminate obtained in the above-described manner to be heat-stable in its dimension.

The heat treatment can be carried out by a desired known method such as contact heating by a heating roll, heating in an oven in the air. It is possible to use the stretching apparatus to heat-treat the porous laminate. Although the heat treatment can be made at a desired temperature lower than the melting point of the thermoplastic resin composing the interlayer and that of the thermoplastic resin composing both outer layers, the heat-treating temperature is set to favorably not less than 100° C. nor more than the melting points of the thermoplastic resins and more favorably not less than 110° C. nor more than 130° C.

Instead of the stretching method, the phase separation method may be used.

The phase separation method is a technique called a conversion method or a micro-phase separation method of forming micro-pores, based on a phase separation phenomenon of a polymeric solution. More specifically, the phase separation method is classified into a method (a) for forming micropores by means of the phase separation of high polymer molecules and a method (b) for making both outer layers porous while micro-pores are being formed at the time of polymerization. As the former method (a), a solvent gelling method using a solvent and a heat fusion quenching solidification method are known. Both methods can be used. In the latter method (b), the phase separation is performed by an increase of the concentration of a polymer in a polymerization process from a monomer to the polymer. In the present invention, the latter method is not used because at the second step of making the interlayer porous, the outermost layers should be pore-unformed.

The above-described extraction method may be used. In the extraction method, an additive which is removable in a later step is mixed with the composition composing the outermost layers, and at the third step, the additive is extracted with chemicals to form the micro-pores. As the additive, a polymeric additive, an organic additive, and an inorganic additive are listed.

As an example of using the polymeric additive, in a method, the outermost layers are formed from two kinds of polymers having different solubility in an organic solvent, and the laminate obtained through the first and second steps is immersed in the organic solvent in which one of the two kinds of the polymers is soluble to extract one of the polymers. More specifically, a method of forming the outermost layers of polyvinyl alcohol and polyvinyl acetate and extracting the polyvinyl acetate with acetone and n-hexane and a method of forming the outermost layers by allowing a block copolymer or a graft copolymer to contain a hydrophilic polymer and removing the hydrophilic polymer with water are known.

A method of using the organic additive may be used. In this method, both outer layers are formed by adding a substance to an organic solvent in which the substance is soluble but a polymer composing both outer layers is insoluble and immersing the laminate obtained at the first and second steps in the organic solvent to remove the above-described substance by extraction.

As the above-described substance, higher aliphatic alcohol such as stearyl alcohol, ceryl alcohol, and the like; n-alkanes such as n-decane, n-dodecane, and the like; paraffin wax; liquid paraffin, and kerosene are listed. These substances can be extracted with an organic solvent such as isopropanol, ethanol, hexane, and the like. As the above-described substance, water-soluble substances such as sucrose and sugar are listed. Because these substances can be extracted with water, they have an advantage of applying little load to environment In the above-described chemical treatment method, the bond of a part of a polymeric substrate is chemically cut and a bonding reaction is carried out to form micro-pores. More specifically, methods of forming micro-pores by treatment with chemicals such as oxidation-reduction treatment, alkali treatment, and acid treatment are exemplified.

In the above-described irradiation etching method, micro-pores are formed by irradiating the laminate with neutron rays or laser. To use this method, it is preferable to compose the outermost layers of polycarbonate, polyester or the like.

In the above-described fusing method, by using micro-powder of a polymer such as polytetrafluoroethylene, polyethylene or polypropylene, the micro-powder of the polymer is sintered after molding operation terminates.

As the above-described foaming method, a mechanical foaming method, a physical foaming method, and a chemical foaming method are known. In the present invention, any of these methods can be used.

The second invention provides a porous laminate produced through the above-described first through third steps and having a gas permeability in the range from 1 to 10,000 seconds/100 ml.

The third invention provides a porous laminate comprising at least three layers including:

a pair of both outer layers, made of a resin composition containing a filler and a thermoplastic resin, which is disposed on outermost surfaces of the porous laminate; and an interlayer, made of a polypropylene resin composition not containing a filler, which is disposed between both outer layers, wherein a large number of micro-pores interconnectable in a thickness direction of the porous laminate is present through both outer layers and the interlayer; and a gas permeability of the porous laminate is set to 1 to 10,000 seconds/100 ml.

As described above, in the porous laminate of the present invention, the gas permeability indicating an index of the interconnectability is set to the range from 1 to 10,000 seconds/100 ml. When the gas permeability is more than 10,000 seconds/100 ml, a numerical value of the gas permeability obtained in measurement indicates that the porous laminate has a construction having a low degree of interconnectability, which means that substantially, the porous laminate does not have interconnectability.

The gas permeability of the porous laminate is set to favorably 1 to 5,000 seconds/100 ml, more favorably 50 to 5,000 seconds/100 ml, and most favorably 100 to 5,000 seconds/100 ml.

The gas permeability is measured in conformity to JIS P 8117.

When the polypropylene resin composition is used as the interlayer, the porous laminate of the present invention is capable of displaying a higher heat resistance than the conventional porous film consisting of the polyethylene resin. That is, the porous laminate of the present invention is capable of retaining its configuration even though it is subjected to a high temperature. The heat shrinkage percentage showing the index of the heat resistance is set to favorably not more than 20%, more favorably not more than 15%, and most favorably not more than 10%.

In the porous laminate of the present invention, the porosity thereof is also an important factor for determining the porous structure. The method of measuring the porosity is described later. It is preferable to set the porosity of the porous laminate of the present invention to the range of 5 to 80%. When the porosity is less than 5%, it is substantially difficult to obtain the interconnectability. When the porosity is more than 80%, it is difficult to handle the porous laminate in terms of the strength thereof, which is unpreferable.

The porosity is set to more favorably 20 to 70% and most favorably 40 to 60%.

Because a demanded range of each of the gas permeability and the porosity is different respectively according to a use, the gas permeability and the porosity are appropriately adjusted according to a use.

For example, when the porous laminate is used for sanitary articles such as a diaper, a feminine hygiene article, and the like, it is preferable that the gas permeability is set to 1 to 2,000 seconds/100 ml.

When the porous laminate is used as a separator for a battery, it is preferable to set the gas permeability to 1 to 500 seconds/100 ml.

The gas permeability and the porosity can be controlled by adjusting the content of the soft segment in the thermoplastic resin composing the interlayer, the period of time in which the laminate is impregnated with the supercritical fluid or the subcritical fluid, and a temperature or a pressure set when the laminate is impregnated with the supercritical fluid or the subcritical fluid.

As the content of the soft segment of the thermoplastic resin composing the interlayer increases, it becomes increasingly easy to impregnate the laminate with the supercritical fluid or the subcritical fluid. Thereby the gas permeability and the porosity become high. The gas permeability and the porosity can be made high by increasing the period of time in which the laminate is impregnated with the supercritical fluid or the subcritical fluid or by making the temperature or the pressure high when the laminate is impregnated with the supercritical fluid or the subcritical fluid.

The thickness and configuration of the porous laminate of the present invention are not specifically limited. For example, the porous laminate of the present invention may be formed as a film having an average thickness of not less than 1 μm nor more than 250 μm, as a sheet having a thickness of more than 250 μm not more than several millimeters or as a molding having a thickness of more than several millimeters. The thickness and configuration of the porous laminate of the present invention can be appropriately selected according to a use.

Above all, the porous laminate of the present invention is film-shaped. That is, the average thickness of the porous laminate is set to 1 to 250 μm, favorably 10 to 200 μm, and more favorably 50 to 150 μm.

The average thickness of the porous laminate is a value obtained by measuring the thickness thereof at five arbitrary inside positions thereof by using a dial gauge graduated in 1/1000 mm and computing an average of five measured values.

It is preferable that the surface of the porous laminate of the present invention is formed as an irregular surface and that a maximum height (Rmax) of the surface thereof is not less than 2 μm. This is because when the maximum height is not less than 2 μm, a proper degree of an irregularity is present on the surface of the porous laminate, and the sliding performance of the surface thereof becomes high. The maximum height (Rmax) of the surface of the porous laminate is set to favorably not less than 3 μm and more favorably not less than 5 μm. An upper limit of the maximum height (Rmax) is not limited to a specific value, but should be not more than 7 μm.

The maximum height of the surface is measured in conformity to the method described in JIS B 0601.

The mass per unit area (basis weight) of the porous laminate of the present invention is set to favorably 10 to 30 g/m$^2$ and more favorably 10 to 25 g/m$^2$, when the mass per unit area thereof is converted to a thickness thereof per 25 μm. By decreasing the basis weight, it is possible to reduce the weight of an apparatus on which the porous laminate of the present invention is mounted.

To show the basis weight, the ratio of the filler to the entire mass of the porous laminate of the present invention, namely, the content ratio of the filler is set to favorably 5 to 40 mass % and more favorably 5 to 30 mass %, as described above.

It is possible to apply the porous laminate of the present invention having the above-described characteristic to various uses demanding a high gas permeability. The porous laminate can be very preferably used as the base material of a separator for a battery; sanitary materials such as a throwaway diaper, body fluids-absorbing pads such as feminine hygiene articles, bed sheets, and the like; medical materials such as operation cloths, hot compress materials, and the like, base materials for cloths such as a jumper, a sport wear, a raincoat, and the like; building materials such as wall paper, a roof-waterproofing material, a heat-insulating material, a sound-absorbing material, and the like; a desiccant; a moisture-proof agent, an oxygen scavenger, a throwaway body warmer, packing materials such as a freshness-retaining material, a food-packing material, and the like.

The porous laminate of the present invention can be preferably used as a separator for a non-aqueous electrolyte battery such as a lithium ion secondary battery utilized as the power source of various electronic appliances.

When the porous laminate is used as the separator for the battery, it is preferable that the gas permeability thereof is set to favorably 50 to 500 seconds/100 ml and more favorably 100 to 300 seconds/100 ml. When gas permeability thereof is less than 50 seconds/100 ml, there is a fear that the electrolytic solution-holding performance thereof deteriorates and thus the volume of the secondary battery becomes small and the cycling performance thereof deteriorates. On the other hand, when the gas permeability thereof is more than 500 seconds/100 ml, ionic conductivity becomes low and thus a sufficient battery characteristic cannot be obtained.

When the porous laminate of the present invention is used as the separator for the battery, it is preferable that the porosity thereof is set to favorably 30 to 70% and more favorably 35 to 65%. When the porosity is less than 30%, the ionic permeability is low and thus it is difficult to obtain a sufficient battery performance. It is not preferable to set the porosity thereof to more than 70% from the standpoint of safety of the battery.

As the separator for the battery, a porous film containing polyethylene resin as its main component is used owing to the necessity of shut-down property. By using the polypropylene resin composition for the interlayer, it is possible to improve dimensional stability subsequent to shut-down and prevent the battery from falling into an unstable state.

The heat resistance can be evaluated in the heat shrinkage percentage thereof. The heat shrinkage percentage thereof is set to favorably 0 to 25% and more favorably 0 to 10%. When the heat shrinkage percentage thereof is more than 25%, there is a fear that positive and negative electrodes contact each other at an end of the porous laminate and short-circuit occurs.

Effect of the Invention

The method of the present invention for producing the porous laminate is thereby capable of securing the interconnectability in the thickness direction of the porous laminate by eliminating the generation of the skin layer in utilizing the subcritical fluid or the supercritical fluid. The elimination of the generation of the skin layer is a problem to be solved in utilizing the subcritical fluid or the supercritical fluid.

The subcritical fluid or the supercritical fluid is used to allow the interlayer to be porous, and a large amount of the organic solvent is not used. Therefore it is possible to apply a smaller amount of load to environment. By using a non-toxic inactive gas such as carbon dioxide or nitrogen as the subcritical fluid or the supercritical fluid, it is possible to apply a much smaller amount of load to the environment. The method for producing the porous laminate of the present invention has an advantage that the producing condition is wide and thus producing steps can be easily managed.

In a method of making a laminate porous by removing a plasticizer or a solvent, there is a possibility that the plasticizer or the solvent remains without being removed. In the present invention, because the subcritical fluid or the supercritical fluid is utilized in allowing the interlayer to be porous, the above-described problem that the plasticizer or the solvent remains in the interlayer does not occur but it is possible to produce the porous laminate having a small amount of impurities. In addition, the method of the present invention for producing the porous laminate is wide in its producing condition and is hence capable of easily managing the producing steps.

By containing the filler in both outer layers of the porous laminate of the present invention, the porous laminate is allowed to have a proper degree of irregularities on the surface thereof. Thereby the porous laminate of the present invention can be preferably used as a porous sheet or film, for example, a separator for a battery demanded to be rough on its surface to some extent. In the separator for the battery, the sliding performance of the porous laminate is improved and handling performance is preferable in the process of winding it.

In the case of a porous film for the battery separator conventionally provided, the maximum height (Rmax) of the surface of the porous film is normally 1 to 2 µm when it is measured by the method described in JIS-B-0610. In addition, in applying a known film-roughening technique to the porous film, for example, in applying the known technique of attaching micro-particles or short fibers to the surface of the porous film, there occurs a problem that essential property requirements for the battery separator such as the strength of the surface thereof, the shut-down characteristic, and the like are damaged.

In comparison with the conventional porous film, it is possible to set the maximum height (Rmax) of the surface of the porous laminate of the present invention to not less than 2 µm without damaging the essential property requirements for the battery separator such as the strength of the surface thereof, the shut-down characteristic, and the like. Therefore the porous laminate of the present invention is capable of contributing to an increase of the capacity of a battery and the improvement of the handling performance in the process of winding it.

As described above, the porous laminate of the present invention has a proper degree of irregularity on its surface because both outer layers contain the filler therein and display a high sliding performance and yet the filler is not present in the interlayer. Thus when the inorganic filler is used for the porous laminate, the mass thereof per area is not increased greatly and thus the porous laminate of the present invention is capable of contributing to a weight saving of an apparatus accommodating the porous laminate.

Because the porous laminate of the present invention contains the polypropylene resin composition in the interlayer thereof, the porous laminate has a higher heat resistance than the conventional porous film consisting of the polyethylene resin. That is, the porous laminate of the present invention is capable of retaining its configuration, even though it is subjected to a high temperature. Consequently when the porous laminate of the present invention is used as the separator for a battery, it is possible to improve dimensional stability subsequent to the shut-down and prevent the battery from falling into an unstable state.

EXPLANATION OF REFERENCE SYMBOLS AND NUMERALS

| 1: | porous laminate |
|---|---|
| 2: | interlayer |
| 3, 4: | both outer layers |
| 2a, 3a, 4a: | micro-pore |
| 10: | separator |
| 20: | non-aqueous electrolyte battery |
| 21: | positive plate |
| 22: | negative plate |

BEST MODE FOR CARRYING OUT THE INVENTION

The embodiments of the present invention will be described below.

Figure 1:
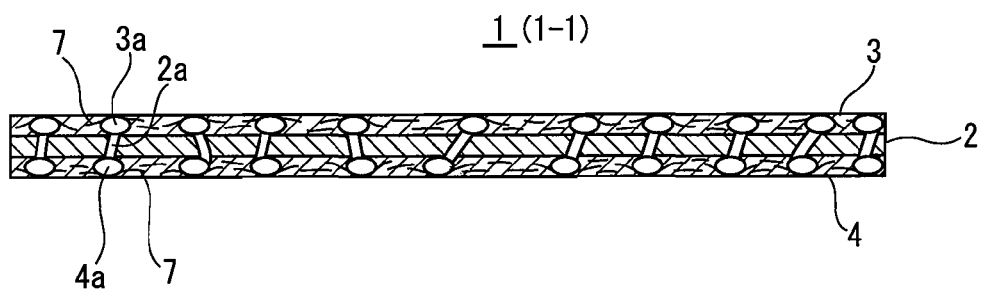
FIG. 1 is a schematic sectional view of a porous laminate of a first embodiment.
Figure 2:
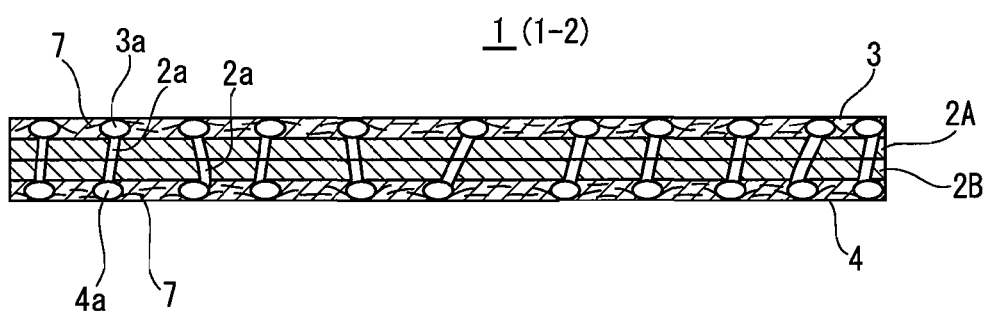
FIG. 2 is a schematic sectional view of a porous laminate of a second embodiment.
Figure 3:
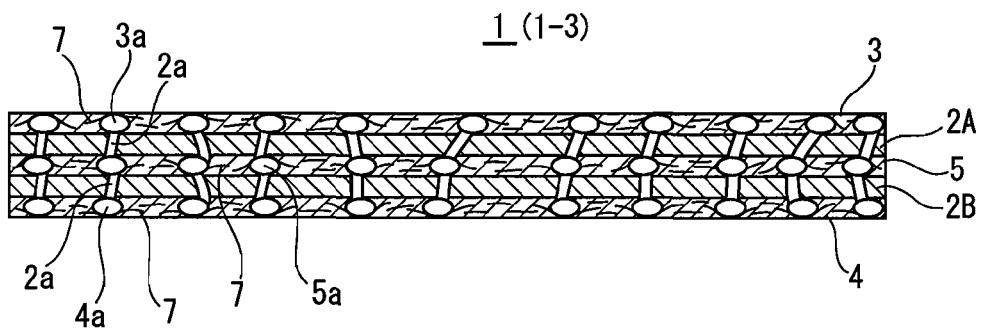
FIG. 3 is a schematic sectional view of a porous laminate of a third embodiment.

FIGS. 1 through 3 show film-shaped resinous porous laminates of the first through third embodiments produced by the producing method of the present invention which will be described later. The porous laminates 1 (1-1, 1-2, 1-3) of the first through third embodiments have different number of layers and are produced by the same producing method which will be described later.

The porous laminate 1 of the first embodiment shown in FIG. 1 has a three-layer construction in which an interlayer 2 and a pair of both outer layers 3, 4 located on both outer surfaces of the interlayer 2 are layered one upon another in a thickness direction of the porous laminate 1 to integrate them with one other. A large number of micro-pores 2a, 3a, and 4a is present in the interlayer 2 and both outer layers 3, 4 respectively with the micro-pores 2a, 3a, and 4a interconnected with one another in the thickness direction of the porous laminate. Both outer layers 3, 4 are made of the same resin composition. The interlayer 2 is made of a resin different from the resin composition composing both outer layers 3, 4.

The resin composition of both outer layer 3 and that of both outer layer 4 may be different from each other.

The porous laminate 1 of the second embodiment shown in FIG. 2 has a four-layer construction having the two interlayers 2 (2A, 2B) and a pair of both outer layers 3, 4 located on outer surfaces of the two interlayers 2 respectively. Similarly to the first embodiment, the micro-pores 2a through 4a formed through these layers are interconnected with one another in the thickness direction of the porous laminate 1.

The porous laminate 1 of the third embodiment shown in FIG. 3 has a five-layer construction having a central interlayer 5, interposed between the two interlayers 2 (2A, 2B), which is made of the same composition as that of both outer layers 3, 4 and a pair of both outer layers 3, 4 located on outer surfaces of the interlayers 2A, 2B respectively. Similarly to the first embodiment, the micro-pores 2a through 5a formed through these layers are interconnected with one another in the thickness direction of the porous laminate 1.

In the porous laminate 1 of the first through third embodiments, both outer layers 3, 4 and the central interlayer 5 of the third embodiment are made of a thermoplastic resin containing a filler 7. The interlayer 2 is made of a thermoplastic resin, having a hard segment and a soft segment, which does not contain a filler.

The method for producing the porous laminate 1 of the first embodiment having the three-layer construction is described below.

As described above, the method for producing the porous laminate of the second embodiment and that for producing the porous laminate of the third embodiment include the following steps similar to those of the first embodiment.

The method for producing the porous laminate 1 includes a first step of forming a laminate by disposing the interlayer 2 made of a polypropylene resin composition between both pore-unformed outer layers 3 and 4 made of a polypropylene resin composition containing polypropylene and a filler added thereto;

a second step of making the interlayer porous by impregnating the obtained laminate with a fluid in a supercritical state or a subcritical state and releasing the fluid from the supercritical state or the subcritical to vaporize the fluid; and a third step of making both outer layers 3 and 4 porous by stretching the laminate in at least one axial direction to separate an interface between the filler of both outer layers 3 and 4 and the thermoplastic resin thereof after the interlayer 2 is made porous.

Used in this embodiment as the polypropylene resin composition composing the interlayer 2 is a resin composition composed of a polypropylene homopolymer and an ethylene-propylene rubber mixed therewith. The content of the ethylene-propylene rubber is set to favorably 5 to 95 mass %, more favorably 15 to 75 mass %, and most favorably 30 to 60 mass %.

The ethylene-propylene rubber having an ethylene content ratio of 30 to 55 mass % for the entire rubber is especially preferable.

The ethylene content ratio for the entire polypropylene resin composition composing the interlayer is set to favorably 5 to 70 mass %, more favorably 5 to 50 mass %, and most favorably 10 to 30 mass % by appropriately adjusting the content of the ethylene-propylene rubber and the ethylene content ratio in the ethylene-propylene rubber.

As the polypropylene composing both outer layers 3 and 4, high-density polyethylene having a density of not less than 0.94 g/cm$^3$ and favorably in the range from 0.95 to 0.97 g/cm$^3$ and having a melt flow rate of not more than 1 g/10 minutes is preferable.

As the filler 7 to be contained in both outer layers 3, 4, an inorganic filler is used in this embodiment. As the inorganic filler, barium sulfate, calcium carbonate or titanium oxide is used. Mixtures of not less than two kinds thereof can be used. The barium sulfate is especially favorable. The average particle diameter of the filler 7 is favorably in the range of 0.1 to 5 μm and more favorably in the range of 0.1 to 3 μm.

The content of the filler for 100 parts by mass of the thermoplastic resin of the porous laminate 1 is set to favorably 50 to 300 parts by mass and more favorably 50 to 150 parts by mass.

To improve the dispersibility of the filler, 1 to 30 parts by mass, favorably 1 to 15 parts by mass, and most favorably 2 to 10 parts by mass of a plasticizer selected from among the above-described ester compound, the amide compound, the alcohol compound, and the like is added to 100 parts by mass of the thermoplastic resin composing both outer layers 3, 4.

The combination of the thermoplastic resin and the filler of both outer layer 3 may be the same as that of the thermoplastic resin and the filler of both outer layer 4, but does not necessarily have to be the same.

The plasticizer does not necessarily have to be added to the thermoplastic resin. When the plasticizer is added thereto, hardened castor oil is preferably used. The hardened castor oil is ester obtained by a reaction between glycerin and a mixture of fatty acids in which 12-hydroxyoctadecanoic acid which is saturated fatty acid obtained by hydrogenating the double bond of ricinoleic acid is contained as the main component thereof. The above-described ester includes monoester, diester, and triester. These esters can be used singly or as mixtures thereof. A mixture containing the triester as its main component is preferable. As fatty acids other than the 12-hydroxyoctadecanoic acid contained in the mixture of fatty acids, hexadecanoic acid, octadecanoic acid, and the like having 12 to 22 carbon atoms are listed. Industrially, the hardened castor oil is produced by hydrogenating castor oil that is non-drying oil.

The following method is used to form the laminate including the three layers consisting of the interlayer 2 and both outer layers 3, 4 disposed with both outer layers 3, 4 sandwiching the interlayer 2 therebetween.

Initially, to form both outer layers 3, 4, the thermoplastic resin, the filler, and the plasticizer are mixed with one another by using a powder mixer such as a Henschel mixer. Thereafter the mixture is kneaded by using a single screw kneader, a twin screw kneader while the mixture is being heated to form a pellet. In consideration of the dispersion state of the filler, it is preferable to use the twin screw kneader.

The moisture content of the pellet is adjusted to not more than 1000 ppm and favorably not more than 700 ppm. When the moisture content of the pellet is larger than 1000 ppm, gel or pin holes are generated to an extremely high extent, which is unpreferable.

The pellet for both outer layers prepared in the above-described manner and the polypropylene resin composition for the interlayer are extrusion-molded by co-extrusion to obtain a film of three layers layered one upon another.

More specifically, by using a multi-layer forming inflation die or a T-die, both outer layers and the interlayer are layered one upon another at 150 to 250° C. and at preferably 190 to 220° C.

The laminate obtained in the first step is put into a pressure container. Thereafter carbon dioxide gas or nitrogen gas is enclosed in the pressure container. The pressure inside the pressure container is raised to set the carbon dioxide gas or the nitrogen gas to the supercritical state or the subcritical state.

More specifically, when the carbon dioxide gas is used, the pressure is raised to not less than 7 MPa and preferably not less than 20 MPa. When the nitrogen gas is used, the pressure is raised to not less than 3 MPa and preferably not less than 15 MPa.

The temperature inside the pressure container may be set to a normal temperature, but may be increased by heating.

By keeping the set pressure and temperature inside the pressure container, the laminate is impregnated with the carbon dioxide gas or the nitrogen gas in the supercritical state or the subcritical state. The impregnating period of time is 10 minutes to two hours and preferably 30 minutes to two hours.

By returning the pressure or the temperature inside the pressure container to the normal pressure or the normal temperature, the carbon dioxide gas or the nitrogen gas which has impregnated the laminate vaporizes to form the micro-pores 2a in the interlayer 2 and thus make the interlayer 2 porous. The pressure or the temperature inside the pressure container may be gradually decreased or rapidly returned to the normal pressure or the normal temperature.

At the second step, the interlayer 2 is made porous, but the gas which has impregnated both outer layers 3, 4 is released from the outer surface thereof without pores being formed therethrough. Thus both outer layers 3, 4 remain pore-unformed. Therefore both pore-unformed outer layers 3, 4 play the role of "cover" for preventing the gas from being released from the interlayer 2.

As described above, the laminate having the interlayer 2 made porous at the second step and both outer layers 3, 4 pore-unformed at the second step is stretched at the third step. In the stretching process, the interface between the filler 7 dispersed in both outer layers 3, 4 and the resin is separated to form micro-pores 3a, 4a in both outer layers 3, 4. The micro-pores 3a, 4a are interconnected with the micro-pores 2a open on the surfaces of both outer sides of the interlayer 2.

As the stretching method which is carried out at the third step, sequential biaxial stretching of stretching the laminate in a longitudinal direction (lengthwise direction) thereof and thereafter in a transverse direction thereof is preferable. The laminate is stretched to 4 to 25 times and preferably 9 to 16 times the original dimension thereof in the area thereof. It is preferable to set the stretching temperature to 40 to 80° C.

After the processing at the third step terminates, heat treatment for providing the porous laminate with dimensional stability to heat may be performed. The heat treatment can be carried out by using a known desired method such as contact heating by using a heating roll, heating in the air inside an oven or the like. The porous laminate may be heat-treated at an arbitrary temperature less than the melting point of the thermoplastic resin composing the interlayer 2 and both outer layers 3, 4. The heat-treating temperature is favorably not less than 100° C. and less than the melting point of the thermoplastic resin and more favorably not less than 110° C. nor more than 130° C.

In the porous laminate 1-2 of the second embodiment, the micro-pores 2a of the two interlayers 2A, 2B can be formed with the micro-pores 2a interconnected with each other at the second step. The micro-pores 2a are interconnected with the micro-pores 3a, 4a formed at the third step.

In the porous laminate 1-3 of the third embodiment, the micro-pores 2a of the two interlayers 2A, 2B can be formed with the micro-pores 2a interconnected with each of interlayers 2A, 2B at the second step. Thereafter at the third step, the micro-pores 5a, 3a, and 4a are formed in the central interlayer 5, and both outer layers 3, 4 respectively and interconnected with the micro-pores 2a of the interlayers 2.

The porous laminate 1 produced in the above-described manner has a gas permeability which is an index of interconnectability at 50 to 5,000 seconds/100 ml and favorably 100 to 5,000 seconds/100 ml. The porosity of the porous laminate 1 is set to 30 to 70% and favorably 40 to 60%.

Both outer layers 3, 4 are made of the polypropylene resin composition containing the filler therein, and the interlayer 2 is also made of the polypropylene resin. Therefore the porous laminate 1 is capable of displaying a higher heat resistance than conventional porous films consisting of polyethylene resin. That is, the porous laminate 1 is capable of retaining its configuration even though it is exposed to high temperatures. As an index of the heat resistance of the porous laminate 1, the heat shrinkage percentage is set to not more than 20% and favorably not more than 15%. The heat shrinkage percentage can be measured by the method described in the "example" of the present invention.

The porous laminate 1 is film-like and has an average thickness set to 1 to 250 μm, favorably 10 to 200 μm, and more favorably 50 to 150 μm. The average thickness of the porous laminate 1 is adjusted according to a use thereof. The average thickness porous laminate 1 is obtained by measuring the thickness thereof at five arbitrary inside positions thereof by a dial gauge graduated in 1/1000 mm and computing the average of the five measured values.

Because the porous laminate 1 contains the filler in both outer layers 3, 4 thereof, both outer surface of the porous laminate 1 is formed not as a smooth surface but as a rough surface having very small irregularities to enhance the sliding performance of the surface thereof. That is, a maximum height (Rmax) of the irregularities of the surface of the porous laminate 1 is set to not less than 2 μm and preferably not less than 5 μm.

Because the interlayer 2 does not contain the filler, the mass per area (basis weight) of the porous laminate 1 is set to 10 to 30 g/m$^2$ and preferably 10 to 25 g/m$^2$, when the mass per area is converted into a thickness per 25 μm so that the porous laminate 1 is lightweight. To make the porous laminate 1 lightweight, the content ratio of the filler for the entire mass of the porous laminate 1 is set to 5 to 40 mass % and preferably 5 to 30 mass %.

The porous laminate 1 can be used for various uses which require a gas permeability. It is especially preferable to use the porous laminate 1 as the separator for a battery.

When the porous laminate 1 of the present invention is used as the separator for a battery, the gas permeability thereof is set to 50 to 500 seconds/100 ml. When the gas permeability thereof is less than 50 seconds/100 ml, there is a fear that the electrolytic solution-retaining performance thereof will deteriorate and thus the capacity of a secondary battery will become small and the cycling performance thereof will deteriorate. On the other hand, when the gas permeability thereof is more than 500 seconds/100 ml, the ionic conductivity thereof will become low and thus a sufficient battery performance cannot be obtained. The gas permeability of the porous laminate 1 is set to favorably 100 to 300 seconds/100 ml.

The porosity of the porous laminate 1 is set to favorably 30 to 70%. When the porosity thereof is less than 30%, the ionic permeability thereof will be low and thus it is difficult for a battery to obtain a sufficient performance. On the other hand, that the porosity of the porous laminate 1 is set to more than 70% is unpreferable from the standpoint of the safety of the battery. The porosity of the porous laminate 1 is set to more favorably 35 to 65%.

As the separator for a battery, a porous film containing polyethylene resin as its main component is conventionally used owing to the necessity of shut-down property. On the other hand, the polypropylene resin composition is used for the interlayer 2 of the porous laminate 1 of the present invention to improve the dimensional stability subsequent to shut-down so that the porous laminate 1 prevents the battery from becoming unstable.

The heat resistance of the porous laminate 1 can be evaluated in terms of the heat shrinkage percentage thereof. The heat shrinkage percentage thereof is set to 0 to 25% and favorably 0 to 10%. When the heat shrinkage percentage thereof is more than 25%, there is a fear that positive and negative electrodes contact each other at an end of the porous laminate and short-circuit occurs.

Figure 4:
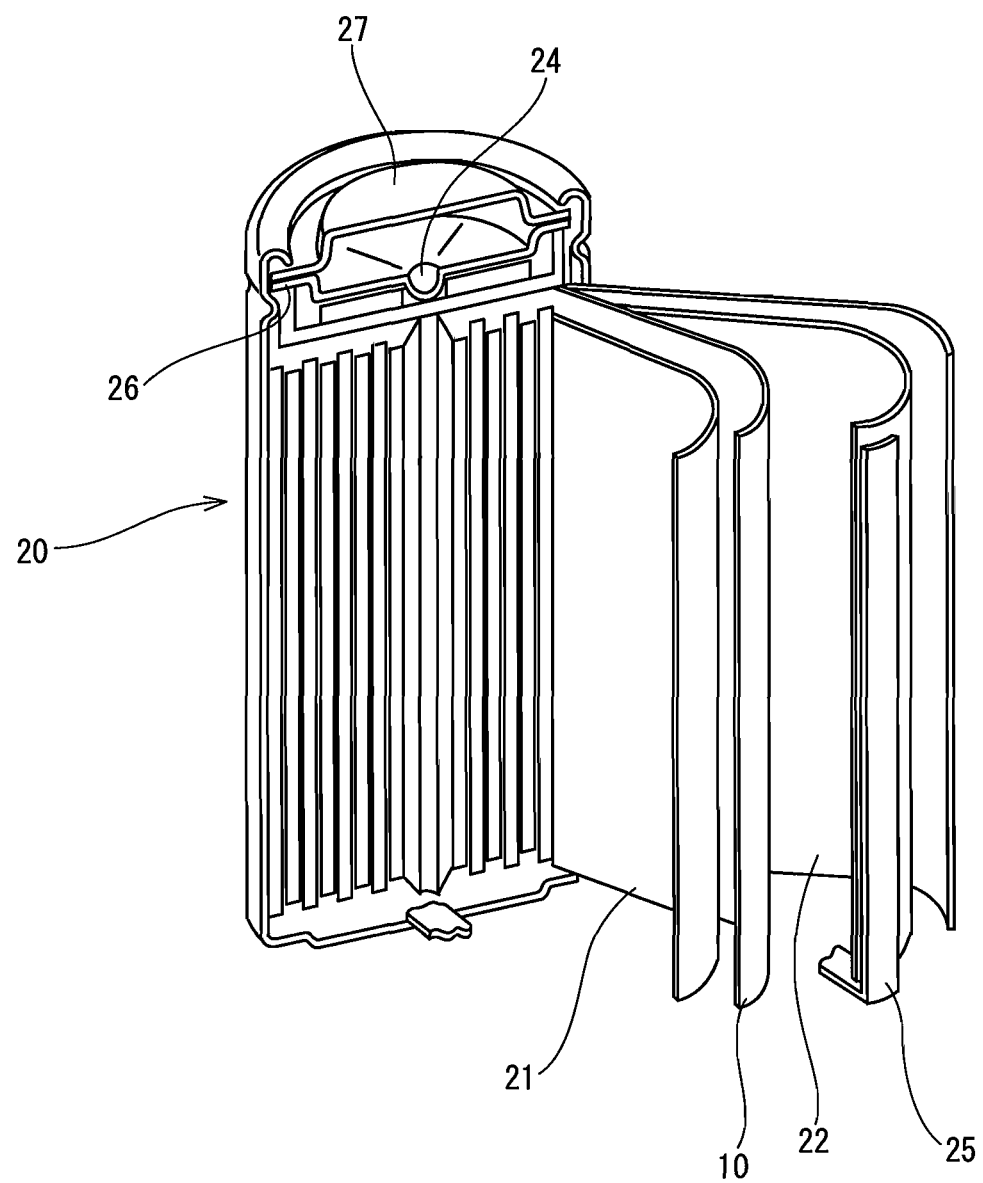
FIG. 4 is a partly broken-away perspective view of a non-aqueous electrolyte battery accommodating the porous laminate of the present invention as a separator thereof.

A non-aqueous electrolyte battery accommodating the porous laminate of the present invention as the separator thereof is described below with reference to FIG. 4.

A positive plate 21 and a negative plate 22 are spirally wound through a separator 10 by layering the positive plate 21 and the negative plate 22 on each other, and the outer side of the assembled unit composed of both positive and negative plates 21, 22 is fastened with a fastening tape. In spirally winding the positive and negative plates 21, 22 and the separator 10, the thickness of the separator 10 is set to favorably 5 to 40 μm and more favorably 5 to 30 μm. When the thickness of the separator 10 is set to less than 5 μm, the separator 10 is liable to be broken. When the thickness of the separator 10 is set to more than 40 µm, the area of the battery will be small when the porous laminate is accommodated in a battery can as the separator thereof by winding the porous laminate and hence the capacity of the battery will be small.

The unit composed of the integrally wound positive plate 21, the separator 10, and the negative plate 22 is accommodated in a bottomed cylindrical battery case and welded to a positive lead 24 and a negative lead 25. Thereafter an electrolyte is injected into the battery can. After the electrolyte is sufficiently penetrated into the separator 10, a positive cover 27 is placed on the periphery of an open portion of the battery can through a gasket 26 to perform preparatory charging and aging. In this manner, the cylindrical non-aqueous electrolyte battery is produced.

An electrolytic solution composed of a lithium salt and an organic solvent in which the lithium salt is dissolved is used. The organic solvent is not limited to a specific one. For example, esters such as propylene carbonate, ethylene carbonate, butylene carbonate, γ-butyrolactone, γ-valerolactone, dimethyl carbonate, methyl propionate and butyl acetate; nitriles such as acetonitrile; ethers such as 1,2-dimethoxyethane, 1,2-dimethoxymethane, dimethoxypropane, 1,3-dioxyolan, tetrahydrofuran, 2-methyltetrahydrofuran, 4-methyl-1,3-dioxyolan, and sulfolane are listed. These substances can be used singly or as mixtures of not less than two kinds thereof.

An electrolyte in which lithium hexafluorophosphate ($LiPF_6$) is dissolved at a rate of 1.4 mol/L in a solvent composed of one part by mass of ethylene carbonate and two parts by mass of methyl ethyl carbonate is especially preferable.

The negative pole composed an alkali metal or a compound, containing the alkali metal, which is integral with a current collection material such as a net made of stainless steel is used. As the alkali metal, lithium, sodium, and potassium are listed. Listed as compounds containing the alkali metal are alloys consisting of the alkali metal and aluminum, lead, indium, potassium, cadmium, tin or magnesium; compounds consisting of the alkali metal and carbon materials; and compounds consisting of the alkali metal having a low potential and metal oxides or sulfides.

When the carbon material is used for the negative pole, it is possible to use the carbon material which is capable of doping a lithium ion and is capable of undoping therefrom. For example, it is possible to use graphite, heat-decomposable carbons, coke, glassy carbons, a sintered material of an organic polymeric compound, meso-carbon micro-bead, carbon fiber, and activated carbon.

In this embodiment, the carbon material having an average particle diameter of 10 µm is added to a solution in which vinylidene fluoride is dissolved in N-methyl pyrrolidone to obtain slurry. After the obtained slurry serving as the negative pole is passed through 70-mesh net to remove large particles, the slurry is uniformly applied to both surfaces of a negative pole current collector consisting of a belt-shaped copper foil having a thickness of 18 µm and dried. After the slurry is compression-molded by using a roll press machine, the molding is cut. An obtained belt-shaped negative pole plate is used as the negative pole.

As the positive pole, metal oxides such as lithium cobalt oxide, lithium nickel oxide, lithium manganese oxide, manganese dioxide, vanadium pentaoxide, and chromium oxide; and metal sulfides such as molybdenum disulfide are used as an active substance. A conductive assistant and a binder such as polytetrafluoroethylene are appropriately added to any of these positive active substances to obtain a mixed agent. The obtained mixed agent is formed into a molding by using a current collection material such as a net made of stainless steel as the core thereof to use the molding as the positive pole.

In the embodiment, a belt-shaped positive plate produced as described below is used as the positive pole. That is, phosphorous-like graphite is added to lithium cobalt oxide ($LiCoO_2$) as a conductive assistant at a mass ratio of 90:5. The mixture and a solution in which polyvinylidene fluoride is dissolved in N-methylpyrrolidone were mixed with each other to obtain slurry. After the slurry for the positive pole was passed through the 70-mesh net to remove large particles, the slurry was uniformly applied to both surfaces of a positive pole current collector, consisting of an aluminum foil, which has a thickness of 20 µm and dried. After the slurry was compression-molded by a roll press machine, it was cut to obtain a belt-shaped positive plate.

Examples of the porous laminate of the present invention are described below.

Example 1

As preparation of a resin composition composing both outer layers, 100 parts by mass of high-density polyethylene and 100 parts by mass of barium sulfate were blended with each other to form a compound. In the example 1, the compound did not contain a plasticizer.

The compound was used as both outer layers, and a thermoplastic resin composition composed of polypropylene containing ethylene-propylene rubber was used as the polypropylene resin composition composing the interlayer. The ratio among the outer layer 1, the outer layer 2 and the interlayer was adjusted to the outer layer 1/the interlayer/the outer layer 2=25/50/25. By using a multi-layer forming T-die, both resin compositions were molded at a temperature of 200° C. to obtain a laminate composed of three layers made of two kinds of the resin compositions.

After the obtained laminate was put in a pressure container, carbon dioxide which is an inactive gas was enclosed in the pressure container at a normal temperature. Thereafter the pressure was increased to 24 MPa to place the carbon dioxide in the subcritical state or the supercritical state. With this state kept for one hour, the laminate was impregnated with the carbon dioxide placed in the subcritical state or the supercritical state. Thereafter a valve of the pressure container was fully opened to release the pressure inside the container.

Sequential stretching was performed by stretching the obtained laminate two times the original length thereof in the longitudinal direction thereof (lengthwise direction) and two times the original length thereof in the traverse direction thereof at 70° C. by a stretcher and thereafter performing thermal fixation at 125° C. to obtain the porous laminate of the example 1.

Examples 2 Through 5

The porous laminates of the examples 2 through 5 were obtained in a manner similar to that of example 1 except that the resin composition composing both outer layers contained a plasticizer consisting of hardened caster oil and that the stretching condition was altered, as shown in table 1.

Examples 6, 7

The porous laminates of the examples 6, 7 were obtained in a manner similar to that of the examples 2 through 5 except that the resin composition composing both outer layers was composed of a polypropylene homopolymer and an ethylene-propylene rubber.

TABLE 1

| | OUTERMOST LAYER 1 | | | INTERLAYER | OUTERMOST LAYER 2 | | | |
|---|---|---|---|---|---|---|---|---|
| | THERMO-PLASTIC RESIN | FILLER | OTHER COMPO-NENTS | COMPO-SITION RATIO | POLYPROPYLENE RESIN COMPOSITION | THERMO-PLASTIC RESIN | FILLER | OTHER COMPO-NENTS | COMPO-SITION RATIO |
| EXAMPLE 1 | 7000FP | B55 | NONE | 50/50/0 | ZELAS5013 | 7000FP | B55 | NONE | 50/50/0 |
| EXAMPLE 2 | 7000FP | B55 | HCOP | 47/50/3 | ZELAS5013 | 7000FP | B55 | HCOP | 47/50/3 |
| EXAMPLE 3 | HY430P | 30NC | HCOP | 67/30/3 | ZELAS5013 | HY430P | 30NC | HCOP | 67/30/3 |
| EXAMPLE 4 | 7000FP | B54 | HCOP | 37/60/3 | ZELAS5013 | 7000FP | B54 | HCOP | 37/60/3 |
| EXAMPLE 5 | 7000FP | B55 | HCOP | 47/50/3 | ZELAS5013 | 7000FP | B54 | HCOP | 37/60/3 |
| EXAMPLE 6 | 7000FP | B55 | HCOP | 47/50/3 | F104A/T310V 50/50 | 7000FP | B55 | HCOP | 47/50/3 |
| EXAMPLE 7 | 7000FP | B55 | HCOP | 47/50/3 | F104A/T310V 25/75 | 7000FP | B55 | HCOP | 47/50/3 |
| COMPARISON EXAMPLE 1 | FILM OF EXAMPLE 1 OF JAPANESE PATENT APPLICATION LAID-OPEN NO. 05-025305 | | | | | | | | |
| COMPARISON EXAMPLE 2 | FILM OF EXAMPLE 1 OF JAPANESE PATENT APPLICATION LAID-OPEN NO. 2004-095550 | | | | | | | | |
| COMPARISON EXAMPLE 3 | FILM OF EXAMPLE 1 OF JAPANESE PATENT APPLICATION LAID-OPEN NO. 11-060792 | | | | | | | | |
| COMPARISON EXAMPLE 4 | 7000FP | B55 | HCOP | 47/50/3 | F104A | 7000FP | B55 | HCOP | 47/50/3 |
| COMPARISON EXAMPLE 5 | 7000FP | B55 | HCOP | 47/50/3 | T310V | 7000FP | B55 | HCOP | 47/50/3 |

| | FLUID IMPREGNATION CONDITION | | STRETCHING CONDITION | | | |
|---|---|---|---|---|---|---|
| | PRESSURE MPa | PERIOD OF TIME hr | STRETCHING TEMPERATURE ° C. | RATIO OF STRETCHED DIMENSION TO ORIGINAL DIMENSION IN LONGITUDINAL DIRECTION | RATIO OF STRETCHED DIMENSION TO ORIGINAL DIMENSION IN TRANSVERSE DIRECTION | THERMALLY FIXING TEMPERATURE ° C. |
| EXAMPLE 1 | 24 | 1 | 70 | 2 | 2 | 125 |
| EXAMPLE 2 | 24 | 1 | 70 | 3 | 3 | 125 |
| EXAMPLE 3 | 24 | 1 | 50 | 4 | 4 | 120 |
| EXAMPLE 4 | 24 | 1 | 50 | 3 | 3 | 120 |
| EXAMPLE 5 | 24 | 1 | 70 | 3 | 2 | 125 |
| EXAMPLE 6 | 24 | 1 | 70 | 3 | 3 | 125 |
| EXAMPLE 7 | 24 | 1 | 50 | 4 | 4 | 125 |
| COMPARISON EXAMPLE 1 | FILM OF EXAMPLE 1 OF JAPANESE PATENT APPLICATION LAID-OPEN NO. 05-025305 | | | | | |
| COMPARISON EXAMPLE 2 | FILM OF EXAMPLE 1 OF JAPANESE PATENT APPLICATION LAID-OPEN NO. 2004-095550 | | | | | |
| COMPARISON EXAMPLE 3 | FILM OF EXAMPLE 1 OF JAPANESE PATENT APPLICATION LAID-OPEN NO. 11-060792 | | | | | |
| COMPARISON EXAMPLE 4 | 24 | 1 | 70 | 3 | 3 | 125 |
| COMPARISON EXAMPLE 5 | 24 | 1 | 70 | 3 | 3 | 125 |

The details of the components described in table 1 are shown below.
"7000EP": high-density polyethylene ("HI-ZEX7000FP" produced by Prime Polymer Co., Ltd., density: 0.954 g/cm$^3$, melt flow rate: 0.04 g/10 minutes)
"HY430P": high-density polyethylene ("NOVATEC HY430P" produced by Japan Polyethylene Corporation, density: 0.955 g/cm$^3$, melt flow rate: 0.8 g/10 minutes)
"B55": barium sulfate ("B-55" produced by Sakai Chemical Industry Co., Ltd., average particle diameter: 0.66 μm)
"30NC": barium sulfate ("30NC" produced by Sakai Chemical Industry Co., Ltd., average particle diameter: 0.3 μm)
"B54": barium sulfate ("B-54" produced by Sakai Chemical Industry Co., Ltd., average particle diameter: 1.2 μm)
"HCOP": hardened caster oil ("HCOP" produced by HOKOKU CORPORATION, density: 0.88 g/cm$^3$)
"Zelas 5013": thermoplastic elastomer composed of polypropylene containing ethylene-propylene rubber ("Zelas 5013" produced by Mitsubishi Chemical Corporation, density: 0.88 g/cm$^3$, melt flow rate: 0.8 g/10 minutes)
"F104A" polypropylene homopolymer ("F104A" produced by Sumitomo Mitsui Polyolefin Company Ltd., density: 0.9 g/cm$^3$, melt flow rate: 3.2 g/10 minutes)
"T310V": ethylene-propylene rubber ("T310V" produced by Idemitsu Kosan Co., Ltd., density: 0.88 g/cm$^3$)

Comparison Example 1

In the comparison example 1, a porous film was formed by carrying out the same method as that described in the example 1 of Japanese Patent Application Laid-Open No. 5-25305 (patent document 1).
More specifically, 20 mass % of ultra-high-molecular-weight polyethylene (UHMWPE) having a weight-average molecular weight of $2.0 \times 10^6$, 66.7 mass % of high-density polyethylene (HDPE) having a weight-average molecular weight of $3.9 \times 10^5$, and 13.3 mass % of low-density polyethylene (LDPE) having a melt index (190° C., load of 2.16 kg) of 2.0 g/10 minute were mixed with one another to prepare 15 parts by mass of a material resin. 85 parts by mass of liquid paraffin (64 cst/40° C.) was mixed with 15 parts by mass of the above-described material resin to prepare a solution of the polyethylene composition. Thereafter 0.125 parts by mass of 2,5-di-t-butyl-p-cresol ("BHT" produced by Sumitomo Chemical Co., Ltd.) and 0.25 parts by mass of tetrakis[methylene-3-(3,5-di-t-butyl-4-hydroxyphenyl)-propionate]methane ("IRGANOX 1010" produced by Nihon Ciba-Geigy K.K.) were added to 100 parts by mass of the solution of the polyethylene composition as an antioxidant. The mixed solution was filled in an autoclave having an agitator to agitate it for 90 minutes at 200° C. to obtain a uniform solution.

The solution was extruded from a T-die by using an extruder having a diameter of 45 mm. While the solution was being taken off by a cooling roll, a set gel sheet was obtained.

With the obtained sheet set on a biaxial stretching machine, integral biaxial stretching was performed at 115° C. and a stretching speed of 0.5 m/minute to stretch the sheet 5×5 times the original dimension thereof. After the obtained stretched film was cleaned with methylene chloride to remove residual liquid paraffin by extraction, the film was thermally set at 100° C. for 30 seconds to obtain a porous polyethylene film having micro-pores.

Comparison Example 2

In the comparison example 2, a porous film was formed by carrying out the same method as that described in the example 1 of Japanese Patent Application Laid-Open No. 2004-95550 (patent document 2).

100 parts by mass of high-density polyethylene ("HI-ZEX7000FP" produced by Prime Polymer Co., Ltd., density: 0.956 g/cm$^3$, melt flow rate: 0.04 g/10 minutes), 15.6 parts by mass of soft polypropylene ("PER R110E" produced by Idemitsu Kosan Co., Ltd.), 9.4 parts by mass of hardened caster oil ("HY-CASTOR OIL" produced by HOKOKU CORPORATION, molecular weight: 938), and 187.5 parts by mass of barium sulfate ("B-55" produced by Sakai Chemical Industry Co., Ltd.) were blended with one another to form a compound.

Thereafter inflation molding was performed on the obtained compound at a temperature of 210° C. to obtain a sheet.

Thereafter sequential stretching was performed by stretching the obtained sheet 1.23 times the original length thereof in the longitudinal direction (MD) at 70° C. thereof and thereafter 2.86 times the original length thereof in the transverse direction (TD) at 115° C. to obtain a porous film.

Comparison Example 3

In the comparison example 3, a porous film was formed by carrying out the same method as that described in the example 1 of Japanese Patent Application Laid-Open No. 11-60792 (patent document 4).

A mixture of eight parts by mass of polyethylene resin having a viscosity-average molecular weight of 500,000, 16 parts by mass of polyethylene resin having a viscosity-average molecular weight of 1,000,000 (viscosity-average molecular weight of mixed composition consisting of both polyethylene resins was about 800,000), 76 parts by mass of paraffin wax (average molecular weight: 389), and 20 parts by mass of calcium carbonate particles (average particle diameter: 18 μm) was extruded at an extrusion temperature of 170° C. and an extrusion amount of 10 kg/hour by using a twin screw extruder with 40 mmφ to obtain a film by inflation method.

After the obtained film was stretched in a longitudinal direction thereof 2.5 times the original length thereof at 40° C. by using a roll stretching machine, it was stretched in a traverse direction eight times the original length thereof at 110° C. by using a tentering stretching machine.

The obtained film was immersed in isopropanol set to 60° C. to remove the paraffin wax by extraction.

The obtained film was thermally fixed at 115° C. by using a roll stretching machine. In performing the thermal fixing, the speed ratio between rolls was adjusted to stretch the film 1.2 times the original length thereof in the longitudinal direction thereof.

Comparison Examples 4, 5

The porous laminates of the comparison examples 4, 5 were obtained in a manner similar to that of example 1 except that as the resin composing the interlayer, instead of the polypropylene resin composition containing the ethylene-propylene rubber, the polypropylene homopolymer or the ethylene-propylene rubber was used.

The properties of the porous laminates of the examples 1 through 7 and the comparison examples 1 through 5 were measured.

Measurement 1: Thickness

The thickness of each of the porous laminates was measured at five arbitrary inside positions thereof by a dial gauge graduated in $1/1000$ mm. An average of the five measured values was set as the thickness of each porous laminate.

Measurement 2: Gas Permeability (Gurley Value)

The gas permeability (second/100 ml) was measured in conformity to JIS P 8117.

Measurement 3: Porosity

The porosity is a numerical value showing the percentage of a spatial portion inside the porous laminate. The porosity is obtained by measuring a substantial mass W1 of the porous laminate, computing a mass W0 of the porous laminate from the density and thickness of a resin composition when the porosity is 0%, and computing the porosity based on an equation shown below from the difference between the mass W0 and the substantial mass W1 thereof:

$$\text{Porosity } Pv(\%) = \{(W0 - W1)/W0\} \times 100$$

Measurement 4: Basis Weight

The basis weight is a numerical value showing the mass of the porous laminate per area. In the method of measuring the basis weight, the porous laminate is cut in 10 centimeter square to measure the mass thereof. Because the basis weight of the porous laminate depends greatly on the thickness thereof, the mass per area is converted into the thickness per 25 μm. This operation was repeated three times to obtain an average of three values as the basis weight of the porous laminate.

Measurement 5: Rmax (Irregularity of Surface)

A maximum height (Rmax) of the surface of the porous laminate was measured in conformity to JIS B 0601.

Measurement 6: Heat Shrinkage Percentage (Heat Resistance))

After the porous laminate was cut to 100 mm×200 mm, an obtained specimen was wound round a glass plate of 150 millimeter square with two sides of the specimen having the length of 100 mm fixed thereto. At that time, a mark was put on the glass plate at the position of the glass plate located at the center of 150 mm in parallel with the two sides of the specimen. Thereafter the specimen was left for two minutes inside an oven set to 120° C. After the specimen was taken out of the oven, a width H1 of the specimen at the portion thereof on which the mark was put was measured. A heat shrinkage percentage S computed by using the following equation was set as the index of the heat resistance of the porous laminate:

$$\text{Heat shrinkage percentage } S(\%) = \{(100 - H1)/100\} \times 100$$

Measurement 7: Content Ratio of Filler

After a mass Wa of each porous laminate was measured, the whole amount of resin was carbonized in a crucible at a high temperature. A residual mass Wb of a filler was measured.

Content ratio(%) of filler=(Wb/Wa)×100

The results of the measurement are shown below in table 2.

TABLE 2

| | Thickness μm | Gas permeability Second/100 ml | Porosity % | Filler content ratio % | Basis weight g/m² | Rmax μm | Heat shrinkage percentage % |
|---|---|---|---|---|---|---|---|
| Example 1 | 120 | 4900 | 42 | 25 | 25 | 3.1 | 1 |
| Example 2 | 125 | 3700 | 48 | 25 | 22 | 3.2 | 3 |
| Example 3 | 99 | 1400 | 52 | 9 | 17 | 2.4 | 4 |
| Example 4 | 74 | 480 | 55 | 30 | 22 | 3.7 | 4 |
| Example 5 | 110 | 2800 | 50 | 27.5 | 27 | 3.7 | 2 |
| Example 6 | 125 | 4300 | 49 | 25 | 22 | 3.1 | 3 |
| Example 7 | 99 | 1400 | 52 | 25 | 17 | 2.4 | 4 |
| Comparison Example 1 | 25 | 400 | 45 | 0 | 13 | 1.5 | 37 |
| Comparison Example 2 | 36 | 100 | 50 | 63 | 33 | 3.2 | 25 |
| Comparison Example 3 | 25 | 360 | 45 | 2 | 14 | 7.2 | 25 |
| Comparison Example 4 | 125 | ∞ | 19 | 25 | 25 | 3.1 | 3 |
| Comparison Example 5 | 125 | 31000 | 24 | 25 | 24 | 3.2 | 3 |

Because the porous film of the comparison example 1 does not contain a filler in the surface thereof, irregularities are formed on the surface thereof to a low degree. Therefore the porous film has a low degree of sliding performance. In addition, the porous film of the comparison example 1 has a low heat resistance.

Because the porous film of the comparison example 2 contains the filler in all the layers, the porous film has a large basis weight and is heavy. In addition, the porous film of the comparison example 2 has a low heat resistance.

Because the porous film of the comparison example 3 contains the polyethylene resin as its main component, the porous film is not sufficiently heat-resistant.

Because the porous laminate films of the comparison examples 4, 5 have a very high gas permeability and a low porosity respectively, they do not show a gas permeability suitable for practical use.

In comparison with the porous laminates of the comparison examples, the porous laminates of the examples 1 through 7 have gas permeabilities of 480 to 4,900 seconds/100 ml and porosities of 42 to 55%, thus showing reliable permeabilities. Thus these porous laminates are sufficiently suitable for practical use. In addition, because the filler is locally present on only the surface of each porous laminate, each porous laminate has irregularities on its surface to a proper degree and hence displays a high degree of sliding performance and yet has a small basis weight and is thus lightweight. In addition, because each porous laminate contains the polypropylene resin composition in the interlayer thereof, it has a high heat resistance and is capable of holding its configuration, even though it is subjected to a high temperature.

INDUSTRIAL APPLICABILITY

The porous laminate of the present invention can be preferably used as the separator for a battery, and in addition, as sanitary articles such as a diaper, packing materials, agricultural and livestock articles, building articles, medical appliances, a separation film, a light diffusion plate, a reflection sheet, and the like.

What is claimed is:

1. A method for producing a porous laminate configured to be a battery separator having micro-pores interconnected with each other in a thickness direction of the laminate, the method comprising:

(A) forming a laminate comprising
  (i) an interlayer comprising polypropylene as a hard segment and ethylene-propylene rubber as a soft segment, and excluding homopolymers of polyethylene and a filler, and
  (ii) a first pore-unformed outer layer and (iii) a second pore-unformed outer layer, each comprising polyethylene and a filler, which are disposed on both outermost surfaces of the interlayer (i);

(B) making the interlayer (i) porous by forming micro-pores through the interlayer (i) after the laminate obtained in (A) is impregnated with a fluid in a supercritical state or a subcritical state, the fluid is relieved from the supercritical state or the subcritical state to vaporize the fluid; and (C) stretching the laminate to separate an interface between the filler and the polyethylene in the first (ii) and second (iii) outer layers, to form micro-pores through the first (ii) and second (iii) outer layers, and to make the first (ii) and second (iii) outer layers porous, thereby interconnecting the micro-pores of the interlayer (i) with micro-pores formed through the first (ii) and second (iii) outer layers after (B), wherein micro-pores are not formed through the first (ii) and second (iii) outer layers when the fluid which has impregnated the laminate in the supercritical state or the subcritical state is relieved from the supercritical state or the subcritical state, and wherein the density of the polyethylene in the first (ii) and second (iii) outer layers is 0.92 g/cm³.

2. The method of claim 1, wherein the fluid for impregnating the laminate (i) in the supercritical state or the subcritical state is carbon dioxide or nitrogen.

3. The method of claim 1, wherein the filler is an inorganic filler.

4. The method of claim 3, wherein the inorganic filler comprises at least one substance selected from the group consisting of barium sulfate, calcium carbonate, and titanium oxide;

wherein an average particle diameter of the filler is 0.01 to 25 μm; and wherein a content of the filler is 5 to 40 parts by mass, based on an entire part by mass of the laminate of 100.

5. The method of claim 3, wherein an average particle diameter of the filler is 0.05 to 7 μm.

6. The method of claim 3, wherein an average particle diameter of the filler is 0.1 to 5 μm.

7. The method of claim 1, wherein the first (ii) and second (iii) outer layers have at least one rough surface having micro-irregularities.

8. The method of claim 1, wherein the hard segment of the interlayer (i) is present in a ratio of 5 to 95 mass % and the soft segment of the interlayer (i) is present in a ratio of 95 to 5 mass %.

9. The method of claim 1, wherein the soft segment of the interlayer (i) further comprises at least one material selected from the group consisting of polyisoprene, polybutadiene, hydrogenated polybutadiene, hydrogenated polyisoprene, polyvinyl chloride, polyether, a further ethylene-propylene rubber, isobutene-isoprene rubber, fluororubber, and silicone rubber.

10. The method of claim 1, wherein the hard segment of the interlayer (i) further comprises at least one material selected from the group consisting of polystyrene, a further polypropylene, polyurethane, polyester, polyamide, polybutylene terephthalate, and fluororesin.

11. The method of claim 1, wherein the propylene of the hard segment of the interlayer (i) further comprises a copolymer.

12. The method of claim 11, wherein the copolymer comprises, in polymerized form, propylene and one, two, or three monomers selected from the group consisting of ethylene, 1-butene, 1-pentene, 1-hexene, 4-methyl-1-pentene, 1-heptene, 1-octene, and 1-decene.

13. The method of claim 11, wherein the copolymer comprises, in polymerized form, propylene and 1-butene.

14. The method of claim 11, wherein the copolymer comprises, in polymerized form, propylene and 4-methyl-1-pentene.

15. The method of claim 1, wherein the ethylene-propylene rubber of the soft segment of the interlayer (i) further comprises a non-conjugate diene monomer.

16. The method of claim 1, wherein the ethylene-propylene rubber comprises ethylene as 7 to 80 mass % of an entire mass of the rubber.

17. The method of claim 1, wherein the ethylene-propylene rubber comprises ethylene as 10 to 60 mass % of an entire mass of the rubber.

18. A porous laminate, produced by the method of claim 1, and having a gas permeability of 1 to 10,000 seconds per 100 mL.

19. The method of claim 18, wherein the first (ii) and second (iii) outer layers further comprise a plasticizer.

20. The laminate of claim 18, having a heat shrinkage percentage of not more than 20%;

a maximum height (Rmax) of a surface of the laminate is not less than 2 μm; and wherein a mass per unit area of the laminate is 10 to 30 g/m², when the mass per unit area is based on a thickness of 25 μm.

21. A battery separator, comprising the laminate of claim 18.

22. A battery, comprising the separator of claim 21.

* * * * *